US008651380B2

(12) United States Patent
Baumert

(10) Patent No.: US 8,651,380 B2
(45) **Date of Patent: *Feb. 18, 2014**

(54) SYSTEM FOR PROCESSING FOLDED DOCUMENTS

(75) Inventor: Dean Baumert, Omaha, NE (US)

(73) Assignee: Election Systems & Software, LLC, Omaha, NE (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/217,945

(22) Filed: Aug. 25, 2011

(65) Prior Publication Data

US 2013/0048725 A1 Feb. 28, 2013

(51) Int. Cl.
*G06K 17/00* (2006.01)

(52) U.S. Cl.
USPC .......................................... 235/386; 235/375

(58) Field of Classification Search
USPC .................. 235/386, 487, 454, 375; 340/540
See application file for complete search history.

(56) References Cited

U.S. PATENT DOCUMENTS

| | | | | |
|---|---|---|---|---|
| 3,201,038 | A | 8/1965 | Harris | |
| 6,854,644 | B1 | 2/2005 | Bolton et al. | |
| 6,892,944 | B2 | 5/2005 | Chung et al. | |
| 7,077,313 | B2 * | 7/2006 | Chung et al. | 235/386 |
| 7,216,807 | B2 | 5/2007 | McClure | |
| 7,464,874 | B2 * | 12/2008 | Donner | 235/386 |
| 7,614,553 | B2 | 11/2009 | Chung et al. | |
| 7,635,087 | B1 | 12/2009 | Chung et al. | |
| 7,635,088 | B2 | 12/2009 | Chung et al. | |
| 7,690,566 | B2 | 4/2010 | Quine et al. | |
| 7,828,215 | B2 | 11/2010 | Chung et al. | |
| 7,975,920 | B2 | 7/2011 | Chung et al. | |
| D643,876 | S | 8/2011 | Miranda et al. | |
| 7,988,047 | B2 | 8/2011 | Chung et al. | |
| 8,066,184 | B2 | 11/2011 | Chung et al. | |
| 8,136,729 | B2 | 3/2012 | Bolton | |
| 8,191,764 | B2 | 6/2012 | Bolton | |
| 8,201,256 | B2 * | 6/2012 | Patanella | 726/25 |
| 8,225,998 | B2 | 7/2012 | Bolton | |
| 8,256,667 | B2 * | 9/2012 | Poznansky et al. | 235/380 |
| 8,261,984 | B2 * | 9/2012 | Baumert et al. | 235/386 |
| 8,261,985 | B2 | 9/2012 | Chung | |
| 8,261,986 | B2 | 9/2012 | Chung et al. | |
| 8,267,306 | B2 | 9/2012 | Bosselaers et al. | |
| 8,352,312 | B2 | 1/2013 | Carbullido | |
| 2008/0308633 | A1 | 12/2008 | Bolton et al. | |
| 2008/0308634 | A1 | 12/2008 | Bolton et al. | |
| 2009/0009790 | A1 * | 1/2009 | Hosokawa | 358/1.14 |
| 2009/0154954 | A1 * | 6/2009 | Waugerman et al. | 399/110 |
| 2010/0054764 | A1 * | 3/2010 | Nishikawa | 399/27 |
| 2011/0017823 | A1 | 1/2011 | Baumert et al. | |
| 2012/0061468 | A1 * | 3/2012 | Arnao et al. | 235/386 |
| 2012/0187188 | A1 | 7/2012 | Schmidt et al. | |

* cited by examiner

*Primary Examiner* — Daniel St Cyr
(74) *Attorney, Agent, or Firm* — Stinson Leonard Street LLP

(57) ABSTRACT

A system for processing folded documents is disclosed. The system includes an input hopper configured to receive a stack of folded documents and an imaging area in which each of the documents is imaged. A pick-up mechanism is configured to transport each of the folded documents from the input hopper to the imaging area. The pick-up mechanism includes first and second barriers that are spaced apart to define a gap through which each of the folded documents is passed, wherein the gap is dimensioned to prevent passage of more than one of the folded documents. Preferably, the system also includes a detection system that is operable to detect the passage of more than one of the folded documents through a detection zone.

46 Claims, 36 Drawing Sheets

Ballots Scanned Report

Jurisdiction Name
Election Name
Election Date

Report Run Date and Time

---

Batch #: 0035

Total Ballots Scanned: 930

Ballot # Range: 001258-002287
Batch Started: 11/04/08 22:14:37 Batch Completed: 11/04/08 22:30:00

Total Ballots Scanned by Precinct:

Precinct #0001: 10
Precinct #0002: 26
Precinct #0003: 37
Precinct #0004: 21
Precinct #0005: 44
Precinct #0006: 76
Precinct #0007: 16
Precinct #0008: 22
Precinct #0009: 17
Precinct #0010: 14
Precinct #0011: 25
Precinct #0012: 20
Precinct #0013: 21
Precinct #0014: 29
Precinct #0015: 32
Precinct #0016: 18
Precinct #0017: 15
Precinct #0018: 35
Precinct #0019: 29
Precinct #0020: 21
Precinct #0022: 28
Precinct #0023: 20
Precinct #0024: 38
Precinct #0025: 22
Precinct #0026: 45
Precinct #0027: 77
Precinct #0028: 23
Precinct #0029: 18
Precinct #0030: 15
Precinct #0031: 26
Precinct #0032: 21
Precinct #0033: 22
Precinct #0034: 30

---

END OF REPORT

Fig. 22

Ballots with Write Ins Report

Jurisdiction Name
Election Name
Election Date

Report Run Date and Time

Batch #: 0035

Total Ballots with Write Ins: 27

Ballot # Range: 001258-002287
Batch Started: 11/04/08 22:14:37 Batch Completed: 11/04/08 22:30:00

Ballots with Write Ins:

| Ballot # | # of Write Ins on Ballot | Contest(s) with Write Ins |
|---|---|---|
| 001258 | 2 | Presidential |
| | | Mayor |
| 001302 | 1 | Senate |
| 001478 | 2 | Presidential |
| | | Senate |
| 001489 | 2 | House Dist 1 |
| | | Mayor |
| 001526 | 1 | Presidential |
| 001527 | 1 | Senate |
| 001544 | 2 | Presidential |
| | | Senate |
| 001601 | 2 | House Dist 1 |
| | | Mayor |
| 001625 | 1 | Presidential |
| 001647 | 1 | Senate |
| 001695 | 2 | Presidential |
| | | Senate |
| 001703 | 2 | House Dist 1 |
| | | Mayor |
| 001752 | 1 | Presidential |

Fig. 23A

Ballots with Write Ins Report

Jurisdiction Name
Election Name
Election Date

Report Run Date and Time

| | | |
|---|---|---|
| 001757 | 1 | Senate |

Ballots with Write Ins: Continued

| Ballot # | # of Write Ins on Ballot | Contest(s) with Write Ins |
|---|---|---|
| 001785 | 2 | Presidential |
| | | Senate |
| 001858 | 2 | Presidential |
| | | Mayor |
| 001882 | 1 | Senate |
| 001883 | 2 | Presidential |
| | | Senate |
| 001901 | 2 | House Dist 1 |
| | | Mayor |
| 001921 | 1 | Senate |
| 001925 | 2 | Presidential |
| | | Mayor |
| 001932 | 1 | Senate |
| 001951 | 2 | Presidential |
| | | Senate |
| 001987 | 2 | House Dist 1 |
| | | Mayor |
| 002001 | 1 | Presidential |
| 002002 | 1 | Senate |
| 002254 | 2 | Presidential |
| | | Senate |

END OF REPORT

Fig. 23B

Ballots Not Scanned Report

Jurisdiction Name
Election Name
Election Date

Report Run Date and Time

Batch #: 0035

Total Ballots Not Scanned: 15

Ballot # Range: 001258-002287
Batch Started: 11/04/08 22:14:37

Batch Completed: 11/04/08 22:30:00

Ballots Not Scanned Detail:

| Ballot # | Reason | Contest(s) |
|---|---|---|
| 001258 | Overvote | Presidential |
| 001302 | Blank | All |
| 001478 | Overvote | Presidential |
| | Write In | Senate |
| 001489 | Read Error | |
| 001526 | Invalid Ballot ID | |
| 001527 | Double Feed | |
| 001544 | Overvote | Presidential |
| 001601 | Overvote | House Dist 1 |
| | Write In | Mayor |
| 001625 | Read Error | |
| 001647 | Invalid Ballot ID | |
| 001695 | Double Feed | |
| | Read Error | |
| 001703 | Invalid Ballot ID | |
| | Double Feed | |

END OF REPORT

Fig. 24

SYSTEM FOR PROCESSING FOLDED DOCUMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to document processing systems and, more particularly, to a system for processing folded documents.

2. Description of Related Art

A variety of different types of document processing systems that scan and process selections marked on one or both sides of a document are used in the United States and throughout the world. For example, central ballot counters are used to scan and process the voting selections marked on paper ballots in order to expedite the tabulation of votes in an election. Also, test scoring machines are used to scan and process the selections marked on test papers. These document processing systems are able to scan and process the selections marked on documents at a much faster rate than if the documents were manually processed. However, most of these document processing systems are unable to scan and process larger documents. As a result, there are limitations on the overall dimensions of the documents to be processed.

BRIEF SUMMARY OF THE INVENTION

The present invention is directed to a system for processing large documents, such as paper ballots or test papers, each of which has been folded so as to reduce the overall dimensions of the document. The system includes an input hopper configured to receive a stack of folded documents and an imaging area in which each of the folded documents is imaged. A pick-up mechanism is configured to transport each of the folded documents from the input hopper to the imaging area. The pick-up mechanism includes a first barrier that is spaced from a second barrier so as to define a gap through which each of the folded documents is passed, wherein the gap is dimensioned to prevent passage of more than one of the folded documents. Preferably, the system also includes a detection system that is operable to detect the passage of more than one of the folded documents through a detection zone.

In an exemplary embodiment, the system is configurable to process either folded documents or unfolded documents as desired for a particular application. In this case, at least one of the first and second barriers of the pick-up mechanism is adjustable between a first Position in which the gap is dimensioned to prevent passage of more than one of the folded documents and a second position in which the gap is dimensioned to prevent passage of more than one of the unfolded documents. Also, the detection system is adjustable to operate in either a first mode for detecting the passage of more than one of the folded documents or a second mode for detecting the passage of more than one of the unfolded documents. As such, the system may be adjusted to one of two different configurations depending on whether the documents to be processed are folded or unfolded documents.

BRIEF DESCRIPTION OF THE DRAWINGS

FIG. 22 is an exemplary output bin report for ballots properly voted and scanned by the system of FIG. 1;

FIGS. 23A-23B is an exemplary output bin report for ballots with write-in votes scanned by the system of FIG. 1;

FIG. 24 is an exemplary output bin report for ballots either improperly voted or improperly scanned by the system of FIG. 1;

DETAILED DESCRIPTION OF EXEMPLARY EMBODIMENT

The present invention is directed to a system for processing folded documents, and is preferably configurable to process either folded documents or unfolded documents as desired for a particular application. The invention will be described in detail below with reference to an exemplary embodiment that comprises a ballot processing system for processing the voting selections marked on folded or unfolded paper ballots. However, it should be understood that the invention is not limited to the specific configuration of this embodiment or to the processing of paper ballots. Rather, the invention may be used to process a variety of different types of documents, including, but not limited to, test papers. In addition, although the exemplary embodiment is described as embodying several different inventive features, one skilled in the art will appreciate that any one of these features could be implemented without the others in accordance with the invention.

Figure 1:
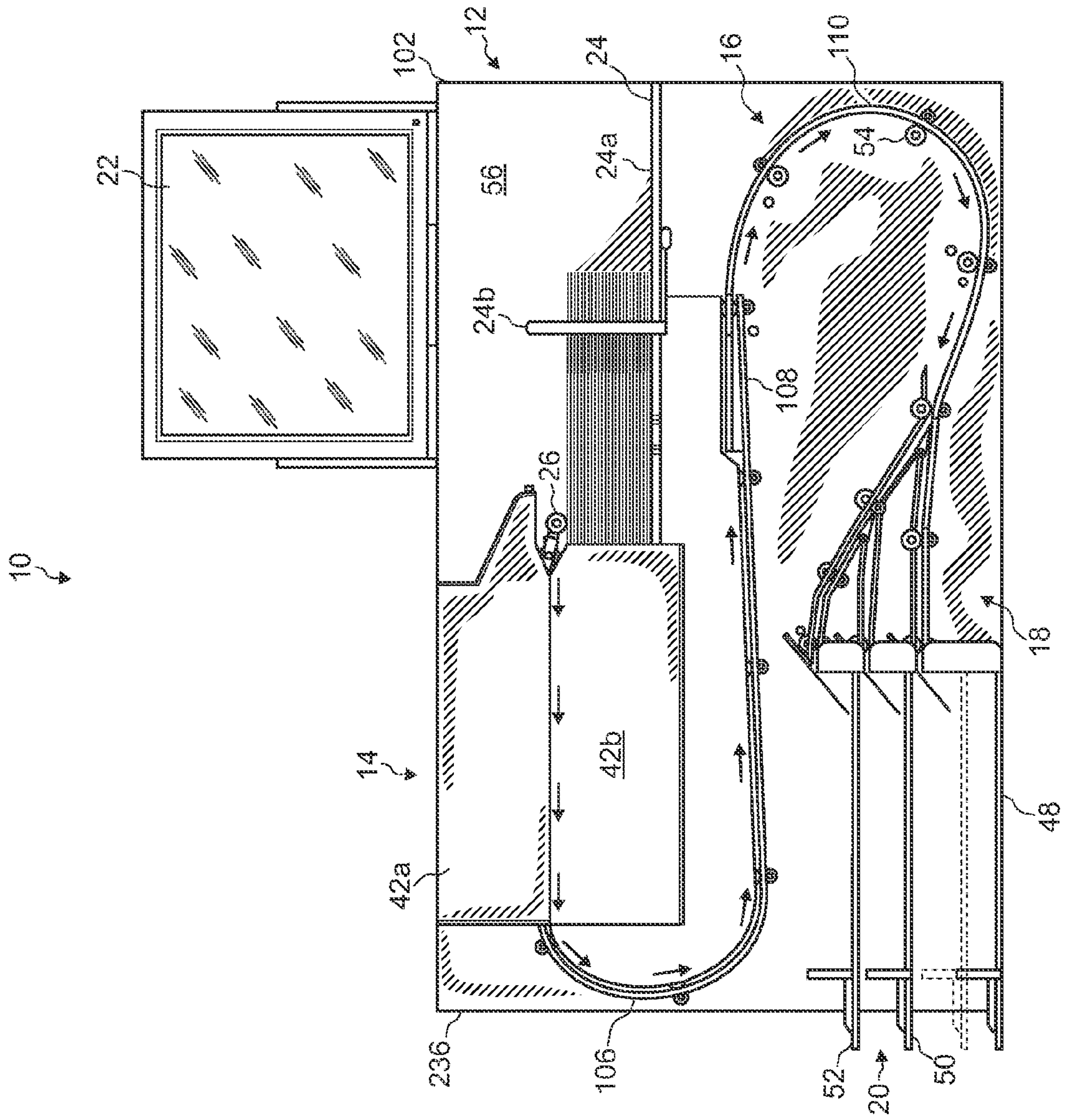
FIG. 1 is a front elevational view of an exemplary embodiment of a ballot processing system in accordance with the present invention.

Referring to FIG. 1, an exemplary embodiment of a ballot processing system in accordance with the present invention is designated as reference numeral 10. System 10 is a high-speed, self-contained machine that receives a stack of folded or unfolded paper ballots and, for each ballot, scans and stores an image of the ballot, processes the ballot image to determine the voting selections marked on the ballot, tabulates the voting selections marked on the ballot, and sorts the ballot into an appropriate output bin.

Figure 25:
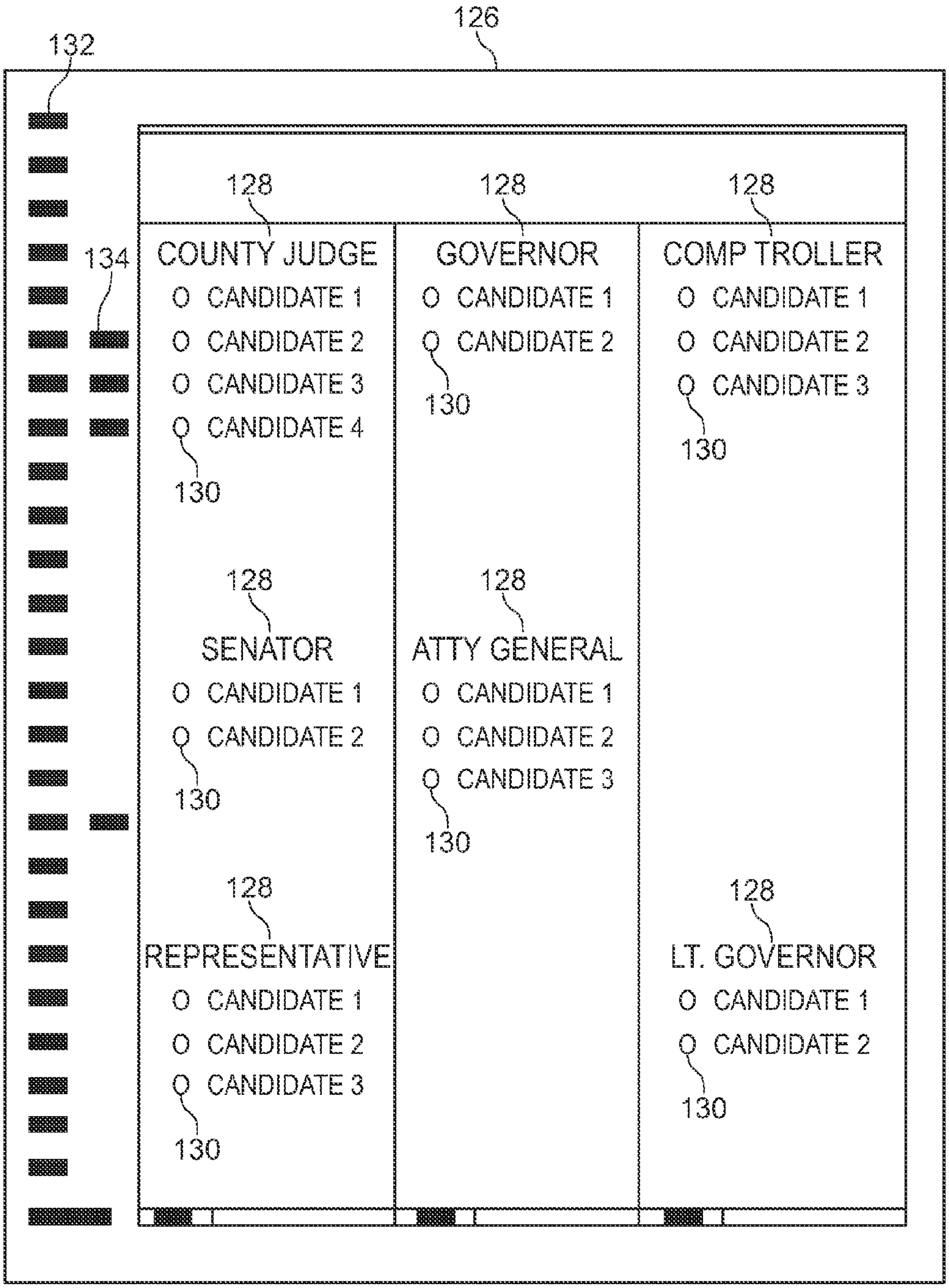
FIG. 25 is an exemplary ballot that can be processed by the system of FIG. 1.

An exemplary unfolded paper ballot that may be scanned and processed by system 10 is shown as reference numeral 126 in FIG. 25. Ballot 126 includes printed indicia 128 that includes a description of each contest (e.g., "County Judge") and the names of the candidates associated with each contest (e.g., Candidates 1-4). Ballot 126 also includes mark spaces 130 corresponding to each of the candidates in each contest. As is known in the art, a voter may darken or otherwise mark the mark space corresponding to his/her selection for each of the contests. Alternatively, a voter may utilize a ballot marking device to print a mark in each of the appropriate mark spaces, such as the AutoMARK® ballot marking device sold by the assignee of the present application. Also, a voting machine may be used to print the entire ballot (i.e., the printed indicia and marked mark spaces). Ballot 126 further includes a series of rectangular timing marks 132 positioned along and down the left side and across the bottom of the ballot. The timing marks 132 permit system 10 to determine the position (i.e., row and column) of each of the mark spaces 130 on the ballot. Ballot 126 further includes a plurality of rectangular code channel marks 134 positioned adjacent the timing marks 132 on the left side of the ballot. The code channel marks 134 are used to identify the ballot style of ballot 126 so that system 10 is able to associate the marked voting selections with the correct contests and candidates printed on the ballot.

Figure 26A:
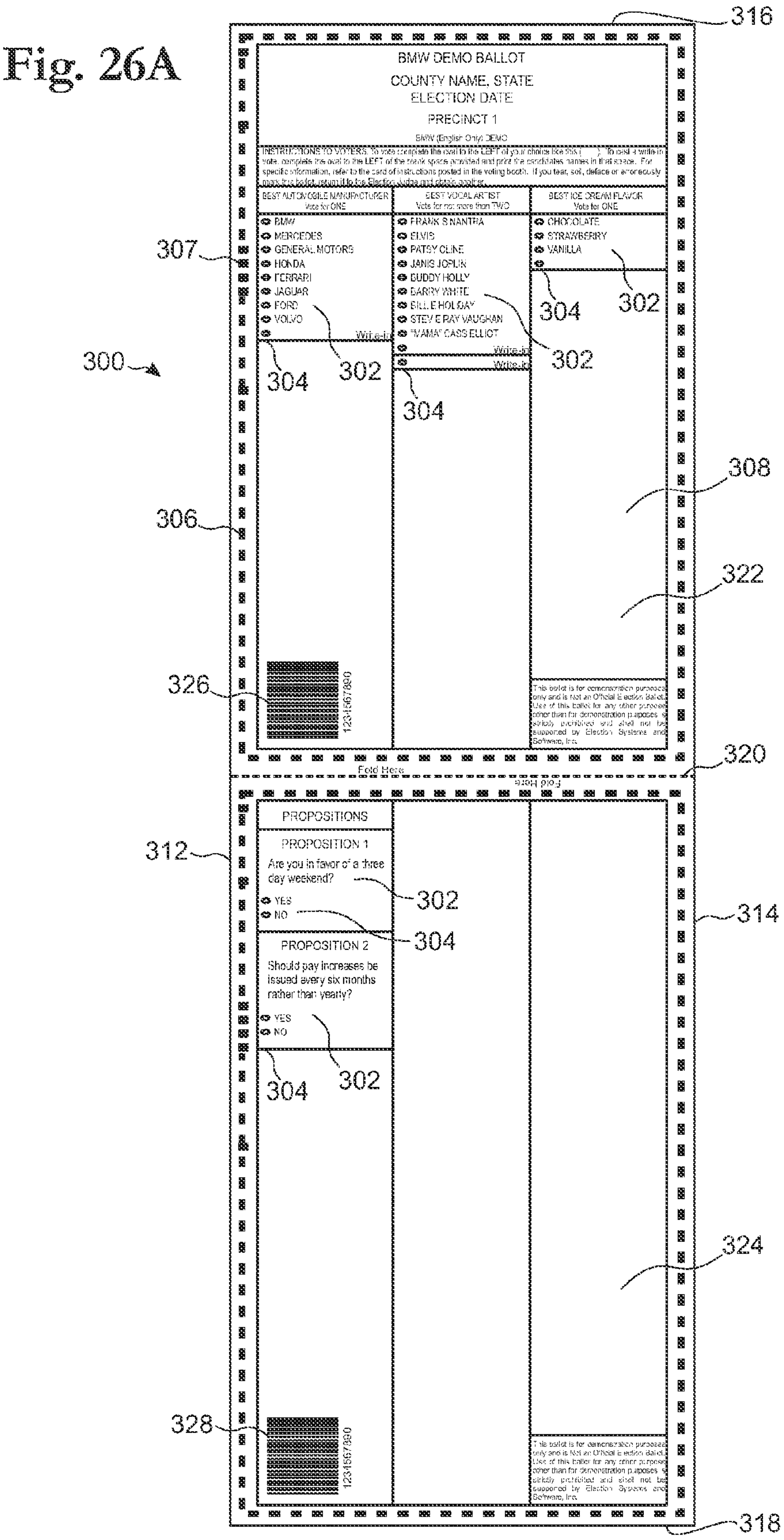
FIG. 26A is an exemplary ballot with a fold line that can be processed by the system of FIG. 1.
Figure 26B:
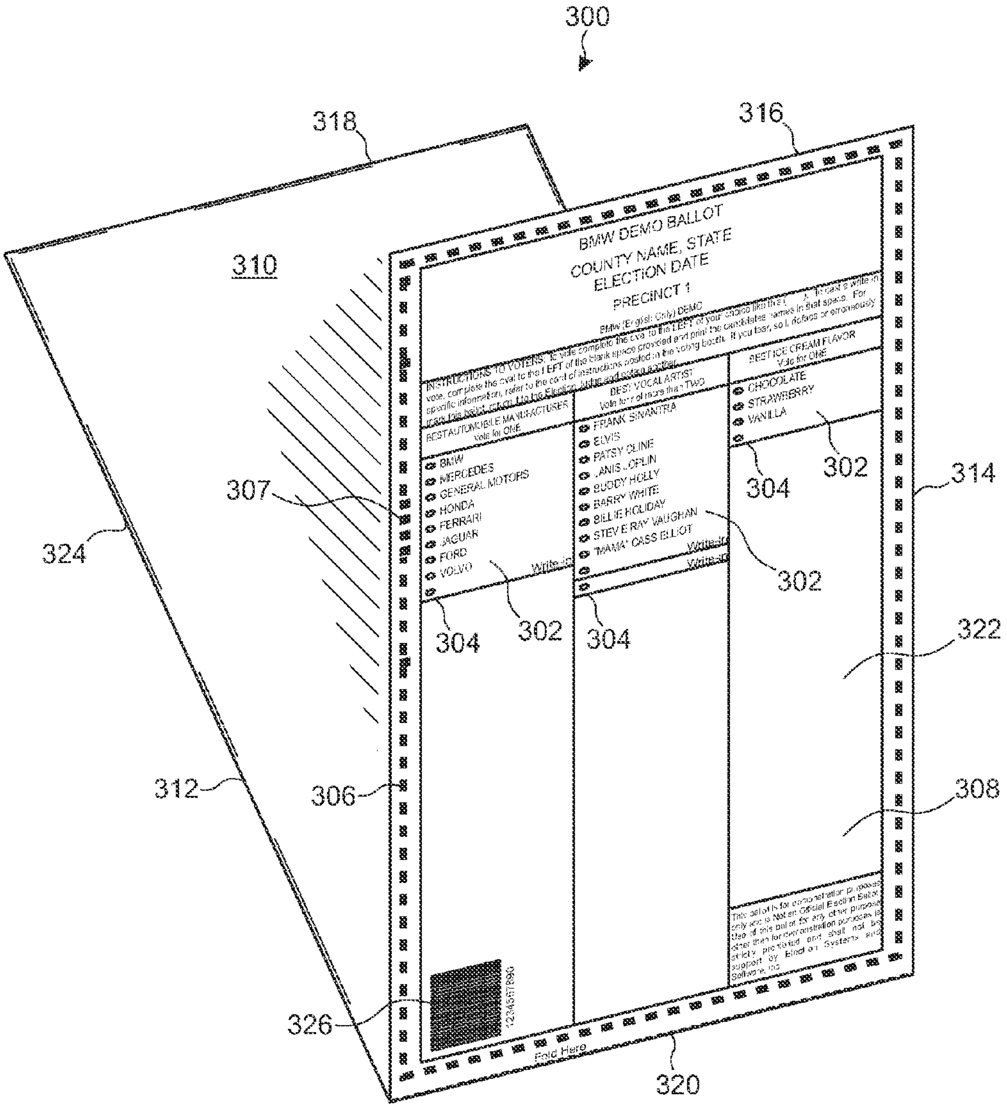
FIG. 26B is the ballot of FIG. 26A in a partially folded state.

FIGS. 26A and 26B show an exemplary folded paper ballot 300 that may be scanned and processed by system 10. FIG. 26A shows the ballot 300 in an unfolded state, while FIG. 26B shows the ballot 300 in a partially folded state. Like ballot 126, ballot 300 includes printed indicia 302 that includes a description of each contest (e.g., "Best Automobile Manufacturer") and the names of the candidates associated with each contest (e.g., BMW, Mercedes, General Motors, etc.). Ballot 300 also includes mark spaces 304 corresponding to each of the candidates in each contest. As described above, these mark spaces may be marked by the voter or a ballot marking device, or, a voting machine may be used to print the entire ballot (i.e., the printed indicia and marked mark spaces). Ballot 300 further includes a series of rectangular timing marks 306 positioned around the peripheral edge of the ballot. The timing marks 306 permit system 10 to determine the position (i.e., row and column) of each of the mark spaces 304 on the ballot. Ballot 300 further includes a plurality of rectangular code channel marks 307 that are positioned adjacent the timing marks 306 on the left side of the ballot and that are slightly wider than the timing marks 306. The code channel marks 307 are used to identify the ballot style of ballot 300 so that system 10 is able to associate the marked voting selections with the correct contests and candidates printed on the ballot.

In its unfolded state shown in FIG. 26A, ballot 300 consists of a single sheet of paper having a front side 308 that contains all of the printed indicia 302 and mark spaces 304 and a rear side 310 (shown in FIG. 26B) that is opposite front side 308. The ballot 300 has left and right side edges 312 and 314, respectively, and top and bottom edges 316 and 318, respectively. A dashed fold line 320 is printed across the front side 308 of the ballot parallel to and equidistant from the top and bottom edges 316 and 318. The fold line 320 divides the front side 308 of the ballot 300 such that there are printed indicia 302 and mark spaces 304 positioned above and below the fold line 320. When the ballot 300 is folded along the fold line 320, as shown in FIG. 26B, the printed indicia 302 and mark spaces 304 positioned above the fold line 320 are displayed on a first side 322 of the folded ballot 300, and the printed indicia 302 and mark spaces 304 positioned below the fold line 320 are displayed on a second side 324 of the folded ballot 300.

As shown in FIGS. 26A and 26B, there is a first barcode 326 printed in the lower left hand corner of the first side 322 of the folded ballot 300, and a second barcode 328 printed in the lower left hand corner of the second side 324 of the folded ballot 300. As discussed in detail below, the first and second barcodes 326 and 328 are identical on ballot 300 and unique from the barcodes printed on other ballots being scanned by system 10. As such, system 10 can scan the barcodes and detect when more than one folded ballot has been fed through the system at the same time. While barcodes are preferably printed on ballot 300, any type of identification marks may be printed on the first and second sides 322 and 324 of ballot 300 in lieu of barcodes 326 and 328.

In the exemplary embodiment, the unfolded ballot 300 (as shown in FIG. 26A) has a width of approximately 8.5 inches and a length of approximately either 22, 28, 34, 38, or 44 inches. Thus, the folded ballot 300 (as shown in FIG. 2613) has a width of 8.5 inches and a length of either 11, 14, 17, 19, or 22 inches. The thickness of ballot 300 when unfolded is approximately 0.006 inches, and when folded approximately 0.012 inches. Of course, the ballot 300 may have any width, length, and thickness in accordance with the present invention. For example, the width and length of ballot 300 when folded or unfolded may correspond with any type of paper size standard such as the ISO 216 or DIN 476 standard. In one alternative embodiment, the width of ballot 300 corresponds with the width of A4 or A3 sized paper.

Figure 27A:
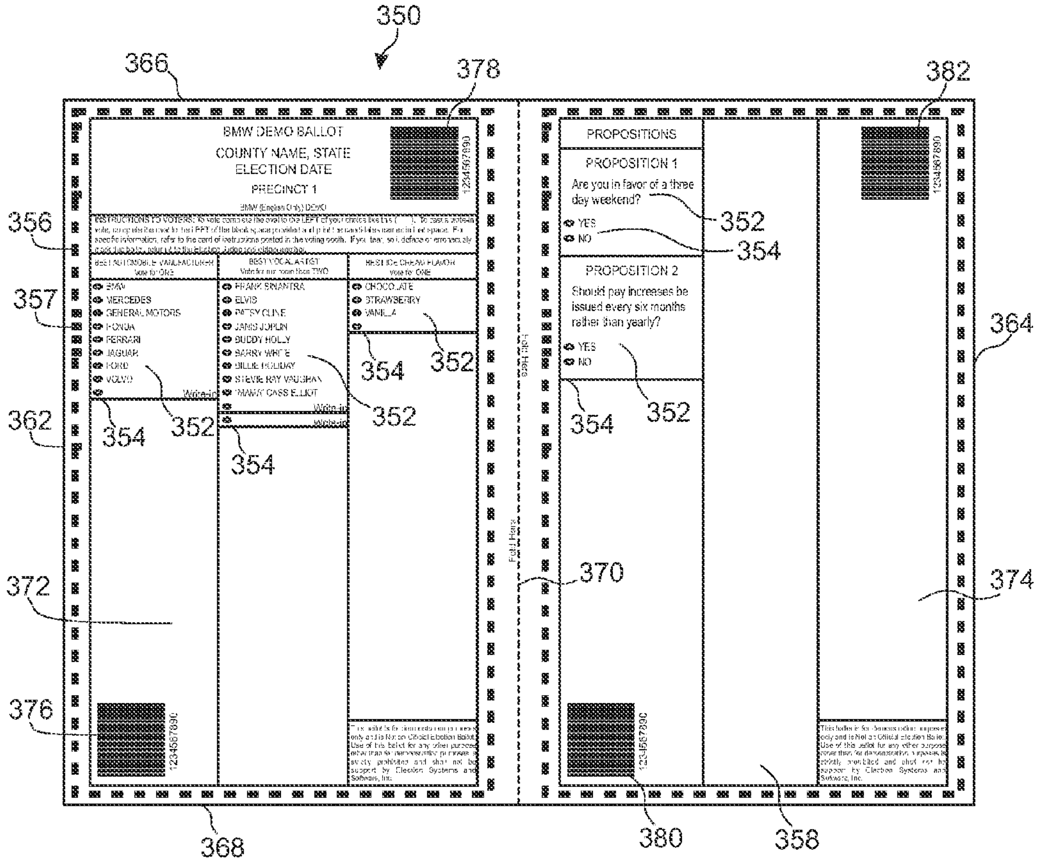
FIG. 27A is another exemplary ballot with a fold line that can be processed by the system of FIG. 1.
Figure 27B:
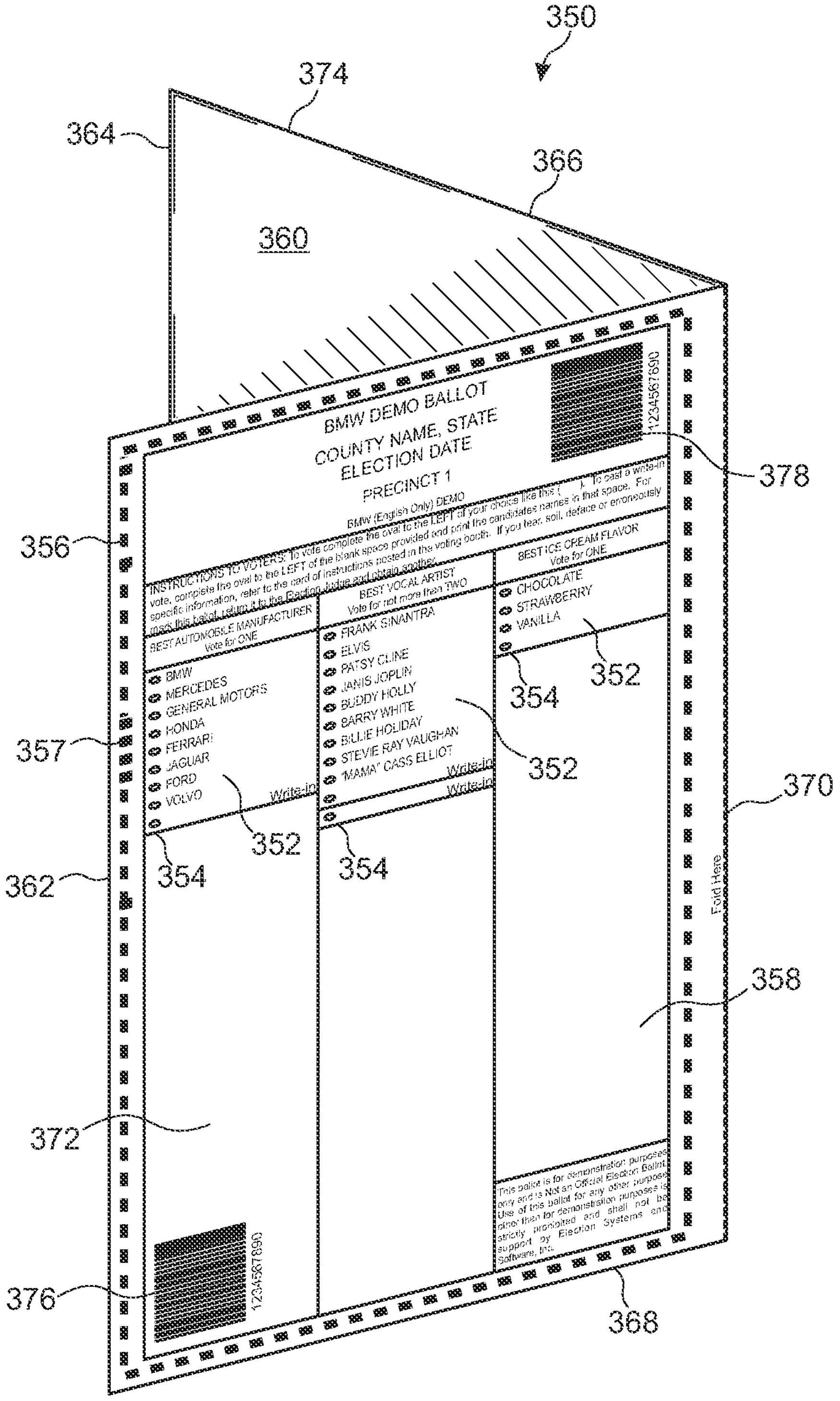
FIG. 27B is the ballot of FIG. 27A in a partially folded state.

FIGS. 27A and 27B show another exemplary folded paper ballot 350 that may be scanned and processed by system 10. FIG. 27A shows the ballot 350 in an unfolded state, while FIG. 27B shows the ballot 350 in a partially folded state. Like ballots 126 and 300, ballot 350 includes printed indicia 352 that includes a description of each contest (e.g., "Best Automobile Manufacturer") and the names of the candidates associated with each contest (e.g., BMW, Mercedes, General Motors, etc.). Ballot 350 also includes mark spaces 354 corresponding to each of the candidates in each contest. As described above, these mark spaces may be marked by the voter or a ballot marking device, or, a voting machine may be used to print the entire ballot (i.e., the printed indicia and marked mark spaces). Ballot 350 further includes a series of rectangular timing marks 356 positioned around the peripheral edge of the ballot. The timing marks 356 permit system 10 to determine the position (i.e., row and column) of each of the mark spaces 354 on the ballot. Ballot 350 further includes a plurality of rectangular code channel marks 357 that are positioned adjacent the timing marks 356 on the left side of the ballot and that are slightly wider than the timing marks 356. The code channel marks 357 are used to identify the ballot style of ballot 350 so that system 10 is able to associate the marked voting selections with the correct contests and candidates printed on the ballot.

In its unfolded state shown in FIG. 27A, ballot 350 consists of a single sheet of paper having a front side 358 that contains all of the printed indicia 352 and mark spaces 354 and a rear side 360 (shown in FIG. 27B) that is opposite front side 358. The ballot 350 has left and right side edges 362 and 364, respectively, and top and bottom edges 366 and 368, respectively. A dashed fold line 370 is printed across the front side 358 of the ballot parallel to and equidistant from the left and right side edges 362 and 364. The fold line 370 divides the front side 358 of the ballot 350 such that there are printed indicia 352 and mark spaces 354 positioned to the left and right of the fold line 370. When the ballot 350 is folded along the fold line 370, as shown in FIG. 27B, the printed indicia 352 and mark spaces 354 positioned to the left of the fold line 370 are displayed on a first side 372 of the folded ballot 350, and the printed indicia 352 and mark spaces 354 positioned to the right of the fold line 370 are displayed on a second side 374 of the folded ballot 350.

As shown in FIGS. 27A and 27B, there is a first barcode 376 printed in the lower left hand corner of the first side 372 of the ballot 350, a second barcode 378 printed in the upper right hand corner of the first side 372 of the ballot 350. Similarly, there is a third barcode 380 printed in the lower left hand corner of the second side 374 of the ballot 350, and a fourth barcode 382 printed in the upper right hand corner of the second side 374 of the ballot 350. As discussed in detail below, the first, second, third, and fourth barcodes 376, 378, 380, and 382 are identical on ballot 350 and unique from the barcodes printed on other ballots being scanned by system 10. As such, system 10 can scan the barcodes and detect when more than one ballot has been fed through the system at the same time. While barcodes are preferably printed on ballot 350, any type of identification marks may be printed on the first and second sides 372 and 374 of ballot 350 in lieu of barcodes 376, 378, 380, and 382.

Unfolded ballot 350 includes a pair of barcodes on each of sides 372 and 374 so that at least one barcode on each side of the ballot 350 passes by a barcode reader when either the top edge 366 or bottom edge 368 of the ballot 350 is the leading edge of the ballot as the ballot is fed through the system 10. While ballot 300 only has one barcode on each of sides 322 and 324 when folded, it is also within the scope of the invention for ballot 300 to have a pair of barcodes on each of sides 322 and 324. Further, it is within the scope of the present invention for ballot 350 to only have a single barcode on each of sides 372 and 374.

In the exemplary embodiment, the unfolded ballot 350 (as shown in FIG. 27A) has a width of approximately 17 inches and a length of approximately either 11, 14, 17, 19, or 22 inches. Thus, the folded ballot 350 (as shown in FIG. 27B) has a width of 8.5 inches and a length of either 11, 14, 17, 19, or 22 inches. The thickness of ballot 350 when unfolded is approximately 0.006 inches, and when folded approximately 0.012 inches. Of course, the ballot 350 may have any width, length, and thickness in accordance with the present invention. For example, the width and length of ballot 350 when folded or unfolded may correspond with any type of paper size standard such as the ISO 216 or DIN 476 standard. In one alternative embodiment, the width of ballot 350 when unfolded is twice the width of A4 or A3 sized paper such that when folded the ballot's width is the same as the width of A4 or A3 sized paper.

Ballots 300 and 350 include fold lines 320 and 370, respectively, so that the ballots may display all of an election's contests on a single side of a sheet of paper and also be folded to a size that system 10 can accommodate. In many jurisdictions, all of the contests in an election must be printed on a single side of the ballot and, in some cases, images of the candidates must be printed on the ballot to assist illiterate voters. These single-sided ballots are relatively large, particularly when there are a large number of contests in an election and/or when the candidate images are printed on the ballot. The fold lines 320 and 370 on ballots 300 and 350, respectively, allow the ballots to be folded so that they can present all of an election's contests on a single side and still be sized so that system 10 can accommodate the ballots when folded.

Ballots 300 and 350 are preferably folded along fold lines 320 and 370, respectively, before the ballots are provided to voters. Each voter is instructed to unfold the ballot, mark his/her voting selections on the ballot, and then fold the ballot along the fold line before returning it to the election official. Alternatively, the ballots 300 and 350 may be provided to voters in an unfolded state, as shown in FIGS. 26A and 27A, respectively. In this case, each voter may be instructed to fold the ballot along its fold line before returning it to the election official. Each voter may also be instructed to return the ballot to the election official in its unfolded state so that an election worker can manually fold the ballot along its fold line or a folding machine can fold the ballot along its fold line.

It should be understood that unfolded ballot 126 and folded ballots 300 and 350 described above are merely examples of ballots that can be processed by system 10. One skilled in the art will appreciate that a variety of different types of ballots and others documents, such as test sheets, may be processed in accordance with the present invention. For example, it is within the scope of the invention for ballots 300 and 350 to not have dashed fold lines 320 and 370, respectively, especially if the ballots are delivered prefolded to voters or if the fold lines 320 and 370 would interrupt the mark spaces and candidates of a single ballot contest.

Figure 2:
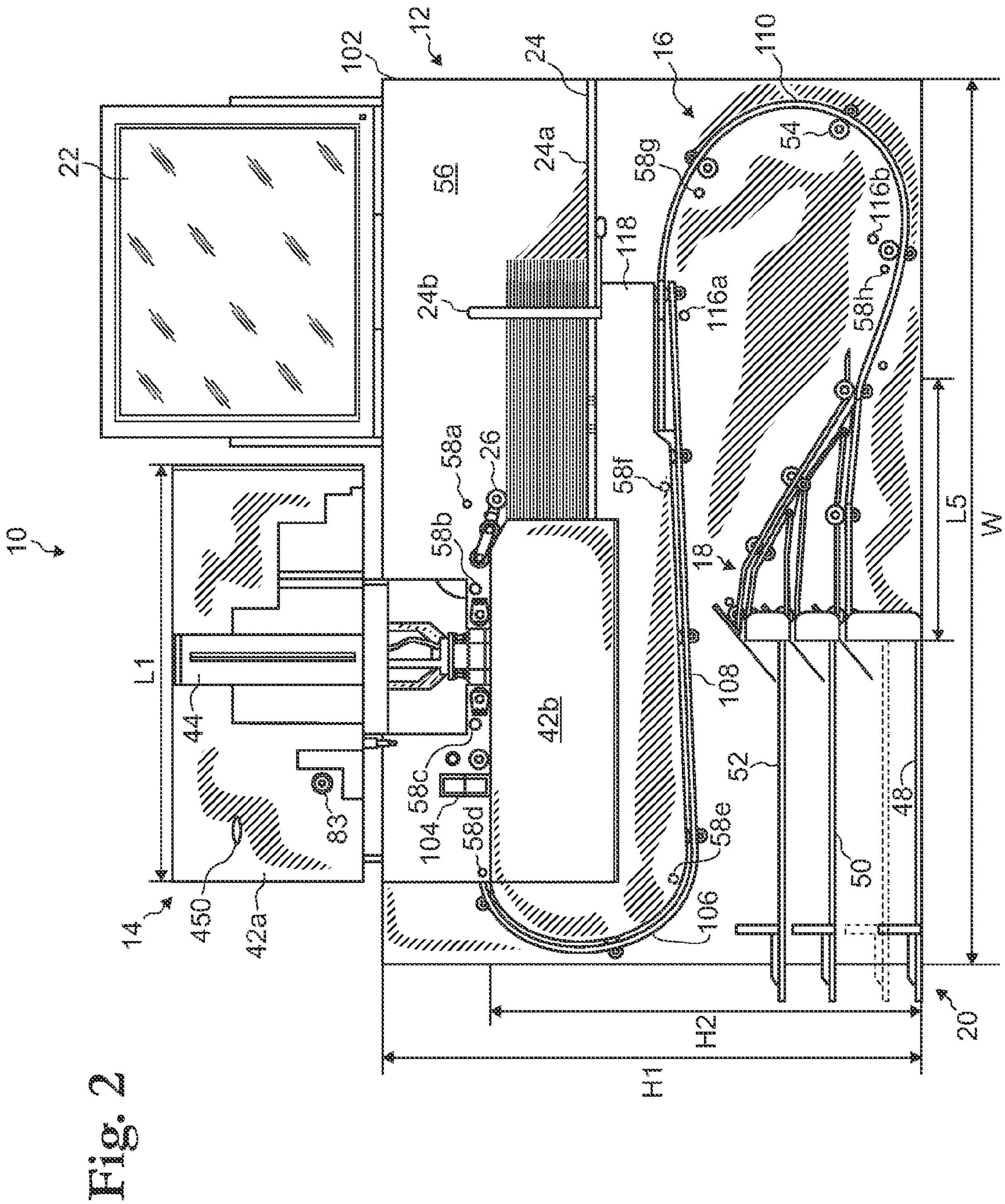
FIG. 2 is a front elevational view of the system of FIG. 1 with an upper read head housing pivoted to an upper position.
Figure 3:
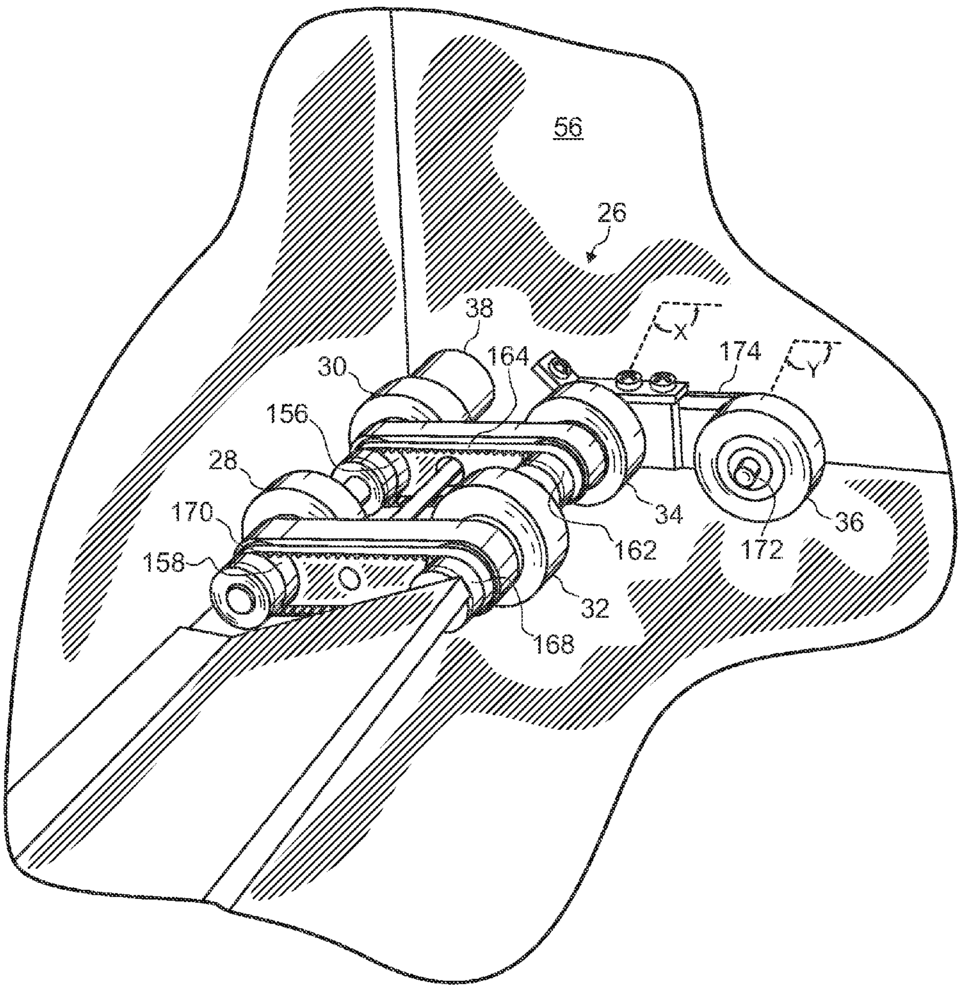
FIG. 3 is a close-up view of a ballot pick-up mechanism of the system of FIG. 1.

Referring now to FIGS. 1 and 2, system 10 generally has an input area 12 with an input hopper 24 and an imaging area 14, an S-curve ballot transport path 16, and an output area 20 with a ballot diverter 18 and a plurality of output bins 48, 50 and 52. The term "input area" is used herein to refer to all of the system components positioned before the transport path, and the term "output area" is used herein to refer to all of the system components positioned after the transport path. Thus, transport path 16 is positioned between input area 12 and output area 20 of system 10.

System 10 also includes a user input device 22 comprising a touch screen display mounted above input area 12 on a pivotal mount so that users of varying heights can adjust the screen to a desirable viewing position. Input device 22 receives input for operating and/or diagnosing problems with the system. For example, input device 22 is operable to receive instructions for starting and stopping the ballot scanning process, setting up system parameters (such as the system date and time), and printing reports (such as diagnostic and election results reports). Although input device 22 is preferably a touch screen display, the input device could alternatively be a computer monitor that is coupled with a keyboard, mouse or other type of input device.

Input Area

Input area 12 includes an input hopper 24 for supporting a stack of folded or unfolded ballots that are ready to be processed and positioning the ballots so that each ballot may be drawn into the imaging area 14 by a ballot pick-up mechanism 26 (FIGS. 2-5). Input hopper 24 can hold between approximately 400 to 600 unfolded ballots or between approximately 200 to 300 folded ballots. Input hopper 24 includes a horizontal tray 24*a* and an adjustable paper guide 24*b*. Horizontal tray 24*a* is moveable up and down via a screw actuator 182, shown in FIG. 9, so that the top ballot in the ballot stack can be picked up by pick-up mechanism 26. Tray 24*a* ensures that pick-up mechanism 26 exerts a constant pressure on each ballot being picked from the ballot stack.

As shown in FIGS. 2-4A, pick-up mechanism 26 is designed to eliminate the problems of drag, skew, and picking more than one ballot, which are common with conventional ballot processing systems. Further, pick-up mechanism 26 is designed to keep ballots properly aligned in imaging area 14 and along transport path 16. In the exemplary embodiment, pick-up mechanism 26 has five rollers 28, 30, 32, 34, and 36 (FIGS. 3 and 4), which rotate simultaneously to pull a ballot into imaging area 14. However, more or less rollers could be used. A main drive shaft 38 connected to rollers 28 and 30 is coupled to a large flywheel 40 (FIGS. 4 and 9), which maintains the pick-up mechanism's speed even when the mechanism picks up folded ballots.

Figure 4:
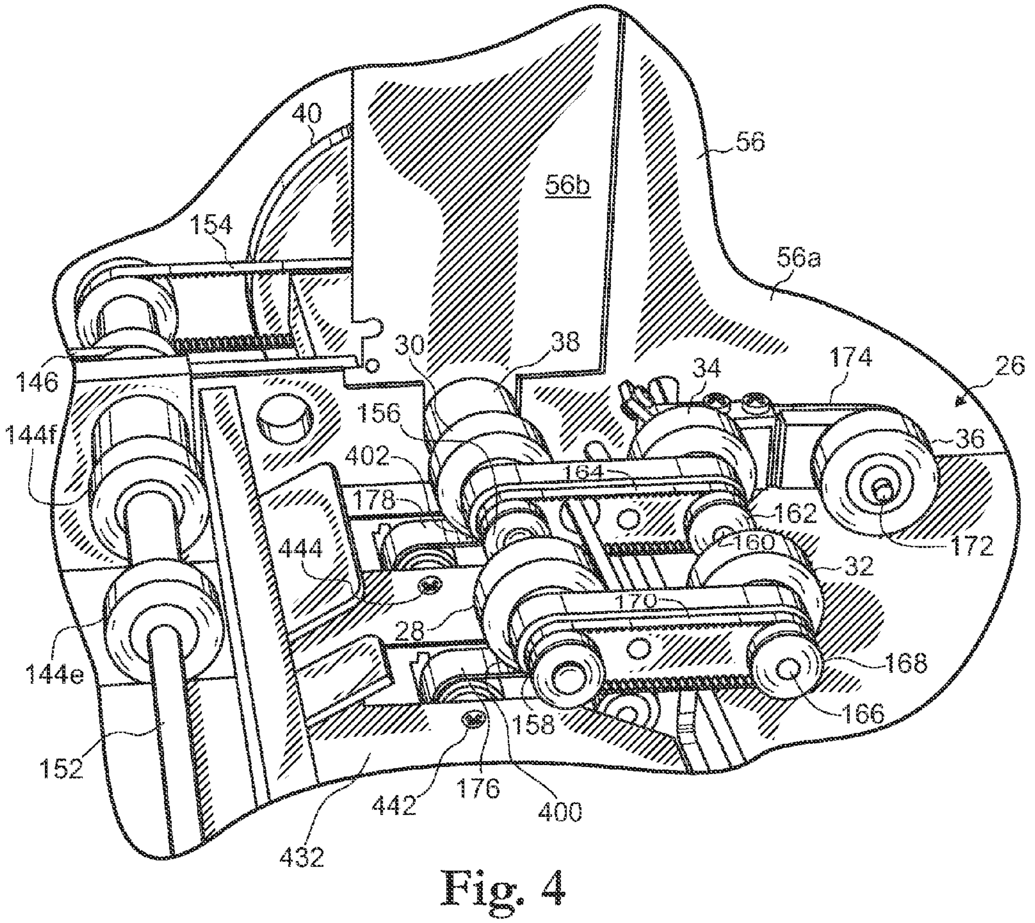
FIG. 4 is a close-up view of the ballot pick-up mechanism shown in FIG. 3.
Figure 9:
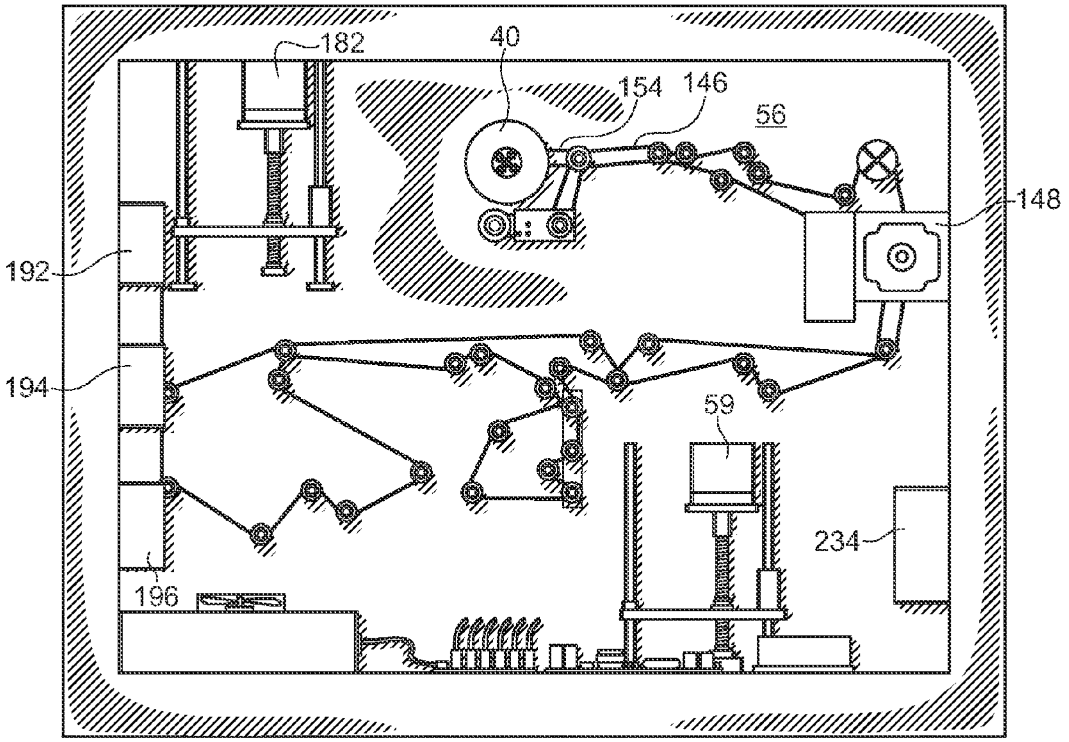
FIG. 9 is a rear elevational view of the system of FIG. 1 with a rear panel of the system removed.

Main drive shaft 38 is connected to a motor 148 via drive belts 146 and 154 (FIG. 9) to rotate main drive shaft 38 in a clockwise direction when the drive shaft is viewed from the front of the ballot processing system 10, as shown in FIG. 4. Main drive shaft 38 extends through and is perpendicular to a back plane 56 that provides a mounting surface for many of the system's components, as shown in FIGS. 1 and 9. A drive pulley 156 is mounted to main drive shaft 38 adjacent to roller 30, and another drive pulley 158 is mounted to main drive shaft 38 adjacent to roller 28.

Pick-up mechanism 26 also has a second drive shaft 160 (FIG. 4) with a roller 34 and adjacent drive pulley 162 mounted thereon. A drive belt 164 extends around drive pulleys 156 and 162 to transfer power from main drive shaft 38 to drive shaft 160. There is also a third drive shaft 166 (FIG. 4) with a roller 32 and adjacent drive pulley 168 mounted thereon. A drive belt 170 extends around drive pulleys 158 and 168 to transfer power from main drive shaft 38 to drive shaft 166. While main drive shaft 38 and drive shaft 166 are perpendicular to backplane 56, drive shaft 160 (FIG. 4) is positioned at an angle X (FIG. 3), which is preferably approximately 92 degrees, with respect to the back plane so that when roller 34 picks a ballot, the ballot is slightly pulled toward backplane 56. In other words, drive shaft 160 is positioned with respect to backplane 56 at a 2 degree angle more than main drive shaft 38.

Another drive pulley 162 is connected to drive shaft 160 on the opposite side of roller 34 for transferring power to a fourth drive shaft 172. Roller 36 is mounted on drive shaft 172 along with a drive pulley. A drive belt 174 extends around the drive pulleys on the shafts 160 and 172 for transferring power from drive shaft 160 to drive shaft 172. Drive shaft 172 is positioned at an angle Y (FIG. 3), which is preferably approximately 94 degrees, with respect to back plane 56 so that roller 36 slightly pulls a ballot toward backplane 56 like roller 34. In other words, drive shaft 172 is positioned with respect to back plane 56 at a 4 degree angle more than main drive shaft 38, and at a 2 degree angle more than drive shaft 160. When main drive shaft 38 rotates to pick the next ballot off of a ballot stack in hopper 24, each of drive shafts 160, 166, and 172 also rotate along with rollers 32, 34, and 36 mounted to the drive shafts.

The angles X and Y are designed so that when rollers 32, 34 and 36 pick a ballot from the top of a ballot stack, the rollers slightly direct the edges of the ballot into the back plane input section 56*a* (FIG. 4), as described below. The angles of the drive shafts 160 and 172 ensure that the edge of each ballot is pulled into contact with the back plane input section 56*a* so that each ballot is properly aligned as it enters imaging area 14 and ballot transport path 16.

Drive shafts 160 and 166 are hinged from main drive shaft 38 so that they are vertically moveable with respect to main drive shaft 38. Likewise, drive shaft 172 is hinged from drive shaft 160 such that it is vertically moveable with respect to drive shaft 160. The hinged design of drive shafts 160, 166 and 172 allows each of them to float freely with respect to main drive shaft 38, and, for drive shall 172, with respect to drive shaft 160. The main drive shaft 38 is stationary except for rotational movement.

Because drive shafts 160, 166 and 172 are able to float freely and move vertically with respect to main drive shaft 38, rollers 32, 34 and 36 that are mounted to these drive shafts are not forced downward into the ballot on the top of the ballot stack, like a conventional belt drive or pick roller assembly. Instead, each of rollers 32, 34, and 36 "rests" on the top ballot in the ballot stack so that the only force exerted on the top ballot is the weight of rollers 32, 34 and 36 and the pick-up mechanism components to which the rollers are mounted. This enables rollers 32, 34 and 36 to consistently pick ballots even if there are ballots within input hopper 24 that stack higher or differently than other ballots within the hopper (e.g., folded ballots typically stack differently than flat, unfolded ballots). Because rollers 32, 34 and 36 are able to move vertically, they simply lay on the top ballot in input hopper 24 regardless of whether that ballot is folded or unfolded. This design, along with the motorized input hopper, ensures that the system applies the same pressure to each ballot that is picked up from the ballot stack.

The pick-up mechanism 26 may optionally have additional rollers that are positioned farther away from backplane 56 than rollers 28, 30, 32, 34, and 36 to ensure that the pick-up mechanism exerts equal pressure across the width of each ballot. For a stack of folded ballots, the additional rollers would prevent the half of a folded ballot on one side of the fold line from twisting relative to the half of the folded ballot on the opposite side of the fold line to ensure that the ballot image is not skewed.

Figure 4A:
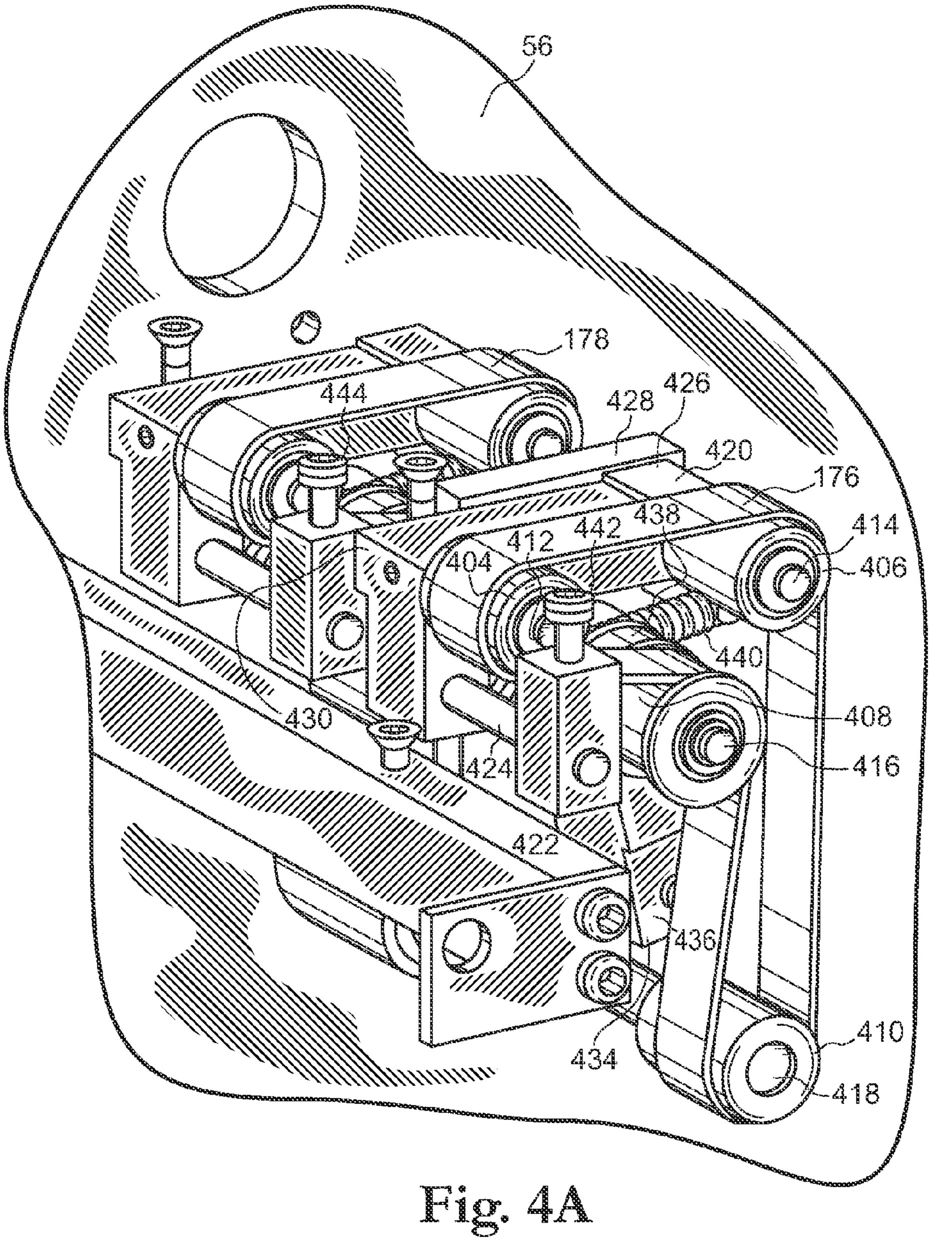
FIG. 4A is a close-up view of a portion of the ballot pick-up mechanism shown in FIG. 3.

Referring to FIGS. 4 and 4A, the pick-up mechanism 26 also has two counter rotating retardation belts 176 and 178, which are positioned beneath rollers 28 and 30 to define gaps 400 and 402 through which each of the ballots is passed. The gaps 400 and 402 are dimensioned to prevent passage of more than one of the unfolded ballots 126 or more than one of the folded ballots 300 and 350. As described in detail below, the retardation belts 176 and 178 are vertically adjustable to increase or decrease the height of gaps 400 and 402 depending on whether the system 10 is processing folded or unfolded ballots.

If rollers 32, 34 and 36 accidentally pick more than one ballot from the top of the ballot stack, then the gaps 400 and 402 between the rollers 28 and 30 and the counter rotating retardation belts 176 and 178, respectively, only allow the top ballot to pass through to imaging area 14. Belts 176 and 178 and rollers 28, 30, 32, 34, and 36 all rotate in a clockwise direction when viewed as shown in FIG. 4. Thus, while rollers 28, 30, 32, 34, and 36 advance ballots from right to left when viewed as shown in FIG. 4, belts 176 and 178 cause ballots to move from left to right. If more than one ballot attempts to pass through the gaps 400 and 402 between rollers 28 and 30 and belts 176 and 178, then the bottom ballot becomes frictionally engaged with belts 176 and 178. Belts 176 and 178 prevent the bottom ballot from entering imaging area 14 by propelling the ballot back toward the ballot stack, or belts 176 and 178 keep the bottom ballot stationary until the top ballot has a chance to pass through the gaps 400 and 402 and into imaging area 14. Thus, if pick-up mechanism 26 picks up more than one ballot, it is self-correcting so that a user does not have to intervene and separate the ballots or restart the system.

Referring to FIG. 4A, retardation belt 176 is wrapped around rollers 404, 406, 408, and 410. Rollers 404, 406, 408, and 410 are mounted on shafts 412, 414, 416, and 418, respectively. Shaft 418 is connected to a motor (not shown) for rotating roller 410 and belt 176. Shafts 412 and 414 are rotatably coupled to a pivoting arm 420, which is connected to an adjustment block 422 via a rod 424. Arm 420 has a first end 426 that is rotatably coupled to a vertical plate 428 and a second end 430 that pivots with respect to first end 426. Vertical plate 428 is fixedly coupled to the horizontal feed plate 432 shown in FIG. 4 over which the ballots pass. Horizontal feed plate 432 is not shown in FIG. 4A so that the components underneath the feed plate may be seen.

Shaft 416 is rotatably coupled to a pivoting tension arm 434, which has a first end 436 that is fixedly coupled to vertical plate 428 and a second end 438 that is coupled to vertical plate 428 with a coil spring 440. Spring 440 permits the second end 438 of tension arm 434, shaft 416, and roller 408 to move generally horizontally toward and away from adjustment block 422. As roller 408 moves toward adjustment block 422, belt 176 is loosened. As roller 408 moves away from adjustment block 422, belt 176 is tightened. Spring 440 draws the roller 408 away from adjustment block 422 with a predetermined desired amount of force to maintain the proper tension in belt 176.

The top surface of adjustment block 422 has a threaded opening that receives an adjustment screw 442. Referring to FIG. 4, adjustment screw 442 is received by an opening in feed plate 432 with a diameter that is larger than the threaded shaft of the screw and smaller than the head of the screw such that the head of the screw is supported by feed plate 432. When adjustment screw 442 is rotated in a clockwise direction, adjustment block 422 moves vertically upward thereby raising rod 424, the second end 430 of arm 420, shaft 412 and roller 404. As roller 404 moves upward, the gap 400 between belt 176 and roller 28 (shown in FIG. 4) decreases. When adjustment screw 442 is rotated in a counter-clockwise direction, adjustment block 422, rod 424, the second end 430 of arm 420, shaft 412 and roller 404 move vertically downward. As roller 404 moves downward, the gap 400 between belt 176 and roller 28 (shown in FIG. 4) increases. Thus, retardation belt 176 is vertically adjustable to increase or decrease the height of gap 400.

Retardation belt 178 is vertically adjustable via an adjustment screw 444 in a similar manner as retardation belt 176. Further, retardation belt 178 is supported by a structure that is very similar to the structure described above that supports belt 176. Thus, the structure that supports and permits adjustability of belt 178 is not described in detail herein. The main difference between the structures that support and permit adjustability of belts 176 and 178 is that the structure that supports and permits adjustability of belt 178 is fixedly coupled to back plane 56 instead of being fixedly coupled to vertical plate 428. Further, another roller (not shown) is mounted on shaft 418 (shown in FIG. 4A) that belt 178 is wrapped around for rotating belt 178.

The retardation belts 176 and 178 are vertically adjustable via adjustment screws 442 and 444 so that the system 10 is configurable to process ballots having different thicknesses. For example, the adjustability of retardation belts 176 and 178 permits the system 10 to process both unfolded ballots (such as ballot 126) and folded ballots (such as ballots 300 and 350). Preferably, when folded ballots are processed by system 10, retardation belts 176 and 178 are set in a first position in which gaps 400 and 402 are dimensioned to prevent passage of more than one of the folded ballots. In the first position, the gaps 400 and 402 are preferably dimensioned such that the distance between rollers 28 and 30 and belts 176 and 178, respectively, is greater than a thickness of one of the folded ballots and less than a combined thickness of two of the folded ballots. When unfolded ballots are processed by system 10, retardation belts 176 and 178 are adjusted to a second position in which gaps 400 and 402 are dimensioned to prevent passage of more than one of the unfolded ballots. In the second position, the distance between rollers 28 and 30 and belts 176 and 178 is preferably greater than a thickness of one of the unfolded ballots and less than a combined thickness of two of the unfolded ballots.

When belts 176 and 178 are set in their first position for the processing of folded ballots, such as ballots 300 and 350 that have a thickness of approximately 0.012 inches when folded, the distance between rollers 28 and 30 and belts 176 and 178 is preferably between approximately 0.013 to 0.023 inches, more preferably between approximately 0.016 to 0.020 inches, and most preferably approximately 0.018 inches. When belts 176 and 178 are set in their second position for the processing of unfolded ballots, such as ballot 126 that has a thickness of approximately 0.006 inches, the distance between rollers 28 and 30 and belts 176 and 178 is preferably between approximately 0.007 to 0.011 inches, more preferably between approximately 0.008 to 0.010 inches, and most preferably approximately 0.009 inches. Of course, one skilled in the art will appreciate that the distance between rollers 28 and 30 and belts 176 and 178 will vary depending on the thickness of the folded or unfolded ballots.

One skilled in the art will understand that the present invention is not limited to the use of rollers 28 and 30 and retardation belts 176 and 178 and that other structures may be used to prevent the passage of more than one of the ballots through gaps 400 and 402. For example, it is within the scope of the invention for the system to only have one roller and one retardation belt. Also, the rollers may be adjustable instead of the retardation belts such that the rollers are vertically moveable in order to adjust the height of the gaps. In addition, the rollers and/or retardation belts may be automatically adjusted instead of manually adjusted via adjustment screws 442 and 444. Further, the rollers may be replaced with any other type of document mover configured to pass the ballots through the gaps, and the retardation belts may be replaced with any other type of document retarder configured to prevent more than one of the ballots from passing through the gaps.

In general, any structure may be used in which a first barrier is spaced from a second barrier to define a gap through which each of the ballots is passed, wherein the gap is dimensioned to prevent the passage of more than one of the ballots. Preferably, at least one of the first and second barriers is adjustable between a first position in which the gap is dimensioned to prevent the passage of more than one of the folded ballots and a second position in which the gap is dimensioned to prevent the passage of more than one of the unfolded ballots.

Referring now to FIG. 9, a single drive motor 148 powers the rollers within pick-up mechanism 26 and imaging area 14. A drive belt 146 (FIGS. 5 and 9) extends from drive motor 148 to the shafts 150 and 152 that mount the rollers 144*a*-144*f* of the imaging area 14. There is another drive belt 154 coupled with the end of shaft 152 and extends from shaft 152 to flywheel 40. Drive belt 154 rotates at the same speed as drive belt 146 to link the rollers of imaging area 14 and pick-up mechanism 26 to ensure that they rotate at the same speed.

Flywheel 40 is mounted to main drive shaft 38 with an electronically controlled clutch so that drive motor 148 and drive belt 146 can constantly rotate the rollers within imaging area 14 at the same speed while allowing main drive shaft 38 of pick-up mechanism 26 to be disengaged from drive motor 148. Disengaging main drive shaft 38 of pick-up mechanism 26 from drive motor 148 allows the rollers of pick-up mechanism 26 to turn off and on for controlling the rate at which ballots are picked from the ballot stack.

Flywheel 40 has a relatively high mass to increase the moment of inertia of main drive shaft 38 when the clutch couples flywheel 40 and drive shaft 38. If flywheel 40 was not present, drive shaft 38 would slow down due to the force required to overcome the forces caused by friction between two adjacent ballots in input hopper 24 and acceleration of a ballot from rest. This slow down would in turn slow down drive belt 146 and imaging area rollers 144*a*-144*f*. Because drive shaft 38 and flywheel 40 in combination have a higher moment of inertia than drive shaft 38 alone, the combination is better able to maintain the speed of main drive shaft 38, and thus the speed of drive belt 146 and imaging area rollers 144*a*-144*f* when the clutch engages flywheel 40 and drive shaft 38. The extra weight of flywheel 40 maintains the momentum and speed of pick-up mechanism rollers 28, 30, 32, 34 and 36 and imaging area rollers 144*a*-144*f* (FIG. 5) throughout the process of picking up ballots, which is particularly important when the ballots are folded. Because flywheel 40 maintains the ballot speed throughout imaging area 14, the cameras 44 and 46 (FIGS. 2 and 5) are able to maintain a constant resolution across the length of a ballot, and thus obtain clear, consistent ballot images.

System 10 maintains the proper orientation of ballots throughout imaging area 14 and transport path 16, while preventing the ballots' edges from fraying. As shown in FIG. 4, backplane 56 has an input section 56*a* that provides an offset of approximately 1/16 of an inch with respect to the remainder of the backplane 56*b*. Pick-up mechanism 26 pulls each ballot from the ballot stack so that the edge of the ballot contacts back plane input section 56*a*. Once the ballot moves past the back plane input section 56*a* and into imaging area 14, the edge of the ballot is no longer in contact with backplane 56 because the remainder of backplane 56*b* is spaced 1/16 of an inch backward from backplane input section 56*a*. Thus, backplane input section 56*a* properly orients ballots by guiding the ballot's edges through input section 56*a*. The offset of backplane input section 56*a* from the remainder of backplane 56*b* prevents a ballot from becoming damaged because the ballot is spaced from backplane 56 during transport along transport path 16. One skilled in the art will appreciate that if ballots processed by system 10 need to be recounted, the recount will be more consistent than it would be with other types of high speed ballot scanners because the ballots are not damaged due to constant contact with the back plane.

Folded ballots such as ballot 300 shown in FIG. 26B are preferably positioned in input hopper 24 so that the edge of the ballot that is folded at fold line 320 is the leading edge positioned adjacent to the pick-up mechanism 26. Orienting ballots such as ballot 300 in this manner ensures that the pick-up mechanism 26 will draw the entire ballot 300 into the imaging area 14 at the same time and not skew the ballot by drawing the first side 322 of the ballot into the imaging area 14 before the second side 324. However, it is within the scope of the invention for ballots such as ballot 300 to be positioned in input hopper 24 so that the edges 316 and 318 of ballot 300 are positioned adjacent to the pick-up mechanism 26.

Folded ballots such as ballot 350 shown in FIG. 27B are preferably positioned in input hopper 24 so that the edge of the ballot that is folded at fold line 370 is positioned adjacent to the back plane 56 of the system 10. Orienting ballots such as ballot 350 in this manner ensures that the sensors which detect the height of the ballots in the input tray 24*a* are able to detect the proper height for ensuring that the system 10 exerts a constant pressure on each ballot being picked from the ballot stack. The system 10 uses the detected height of the ballots in the input tray 24*a* to vertically move input tray 24*a* to a position which ensures that pick-up mechanism 26 exerts a constant pressure on each ballot being picked from the ballot stack. However, it is also within the scope of the invention for ballots such as ballot 350 to be positioned in the input hopper 24 so that the edges 362 and 364 of the ballot 350 are positioned adjacent to the back plane 56.

Figure 5:
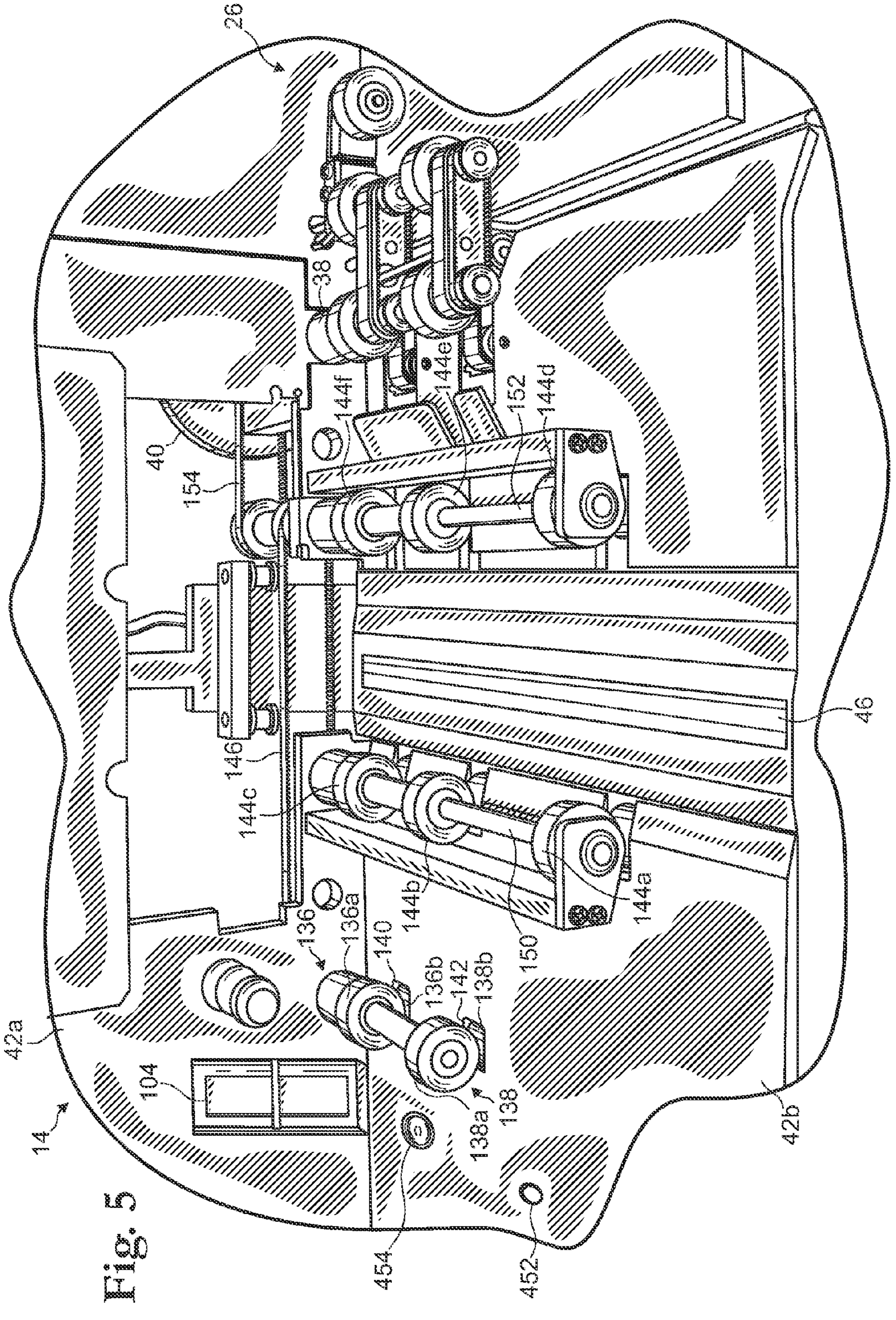
FIG. 5 is a close-up view of an imaging area of the system of FIG. 1.

Referring to FIGS. 2 and 5, imaging area 14 has upper and lower read head housings 42*a* and 42*h* that respectively contain upper and lower high-speed cameras 44 and 46. Cameras 44 and 46 are positioned to image both sides of a double-sided unfolded ballot or both sides of a folded ballot. In the exemplary embodiment, cameras 44 and 46 are 60 megahertz digital electronic CCD cameras. As shown in FIG. 2, upper housing 42*a* can pivot upward with respect to lower housing 42*b* so that an operator may access the scanning components of system 10. As shown in FIG. 2, the length L1 of imaging area 14 is preferably between approximately 15 to 25 inches, and most preferably approximately 19 inches.

Referring to FIG. 2, an ink cartridge 104 is mounted adjacent to the ballot path in a position such that the cartridge can print an identifying mark on each ballot that passes through imaging area 14. Ink cartridge 104 preferably contains more than one color of ink so that the cartridge is capable of printing a different color on a ballot each time the ballot is processed by the system. As an alternative to providing an ink cartridge with more than one color, a plurality of ink cartridges each having a different color may be provided to print a different color marking each time that a set of ballots is scanned. One skilled in the art will appreciate that many different types and configurations of color markings may be used.

Having an ink cartridge with different colors allows the system to identify how many times a ballot has passed through the system based on the color(s) of the identifying mark(s) printed on the ballot. This feature assists in recounting ballots because the system can easily determine whether a ballot has been counted and/or recounted based on whether a particular identifying mark has been printed on the ballot. For example, if a set of ballots is scanned once, and a court subsequently orders a recount of those ballots, then the system can be programmed to analyze the image of each ballot being recounted to ensure that an identifying mark of a certain color is present on the ballot. During the recount, a new color of ink is used to mark the ballot with another identifying mark. This feature may also be used to prevent processing a ballot more than once and thereby double counting the voting selections marked on the ballot. For example, the system can be programmed not to tabulate the voting selections marked on a ballot if an identifying mark of a certain color is detected on the ballot (indicating that the ballot has already been scanned and tabulated).

In the exemplary embodiment, the first time that the system scans a ballot, the system prints a red identification number on the ballot to indicate that the ballot has been scanned once. This red identification number may consist of, for example, a machine identification number along with an incremental index number so as to provide a unique ballot identification number on each ballot processed by the system. If that same ballot passes through the system a second time, such as during a recount, then the system recognizes that the ballot has been scanned once due to the detection of the red identification number and instructs ink cartridge 104 to mark the ballot in a different location with a different color, such as green or blue. This process can repeat each time the ballot is scanned by the system until the ballot is marked with as many colors as are present in ink cartridge 104.

Transport Path

When a ballot leaves imaging area 14, it moves along transport path 16 until it reaches diverter 18. In the exemplary embodiment, transport path 16 includes a first curve section 106, a slightly inclined planar section 108, and a second curve section 110. As shown by the arrows in FIG. 1, once a ballot exits imaging area 14, it enters first curve section 106 where it is turned around to travel in the opposite direction along planar section 108. At the end of planar section 108, the ballot enters second curve section 110 where it is turned around before it reaches the diverter 18. Transport path 16 is designed so that by the time a ballot reaches diverter 18, system 10 has processed the ballot image to determine the voting selections marked on the ballot (described below). As such, the system is able to determine which output bin 48, 50 or 52 (FIG. 1) the ballot should be diverted to before the ballot reaches diverter 18.

Figure 10:
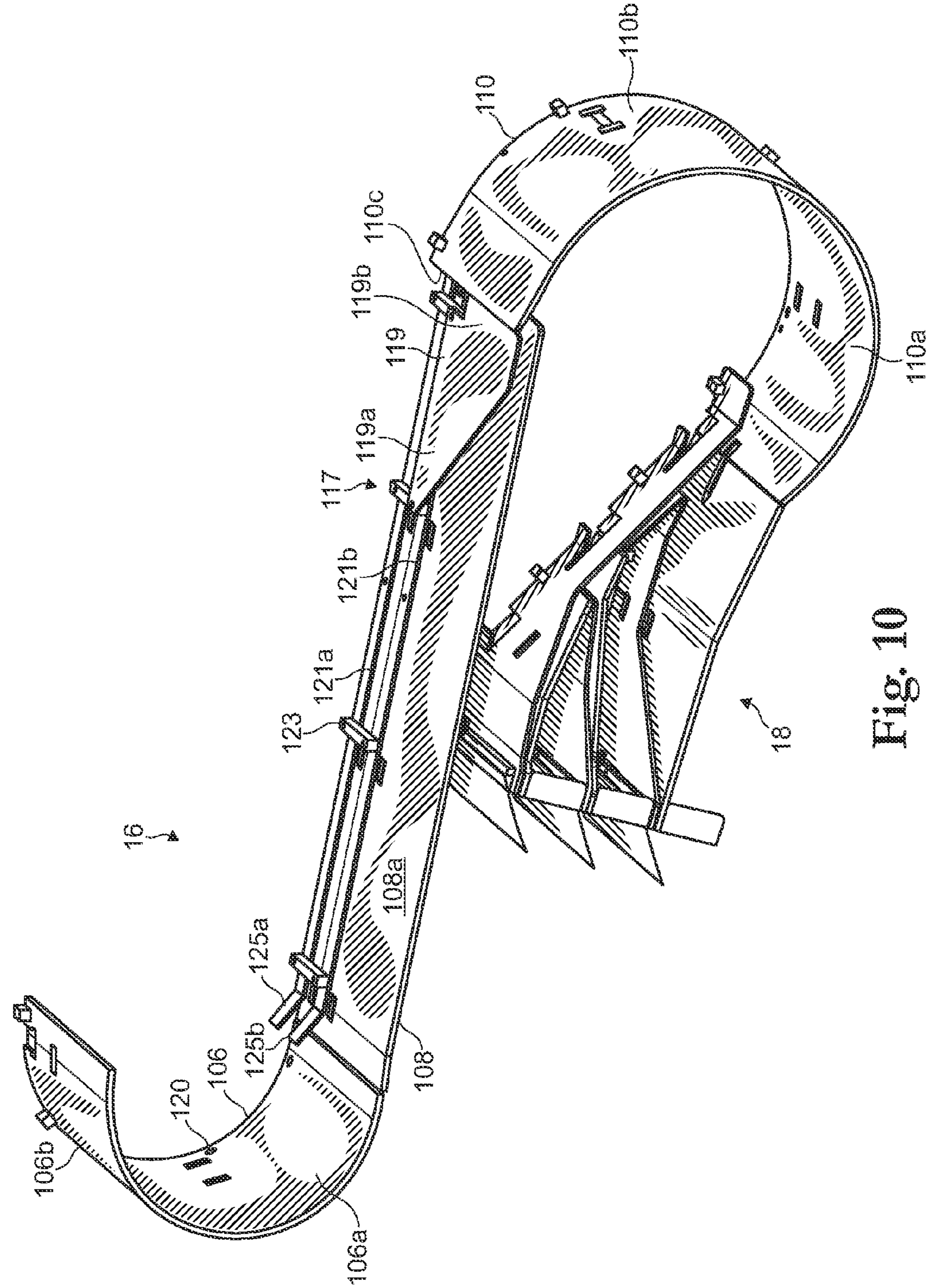
FIG. 10 is a perspective view of an S-curve ballot transport path of the system of FIG. 1.
Figure 11:
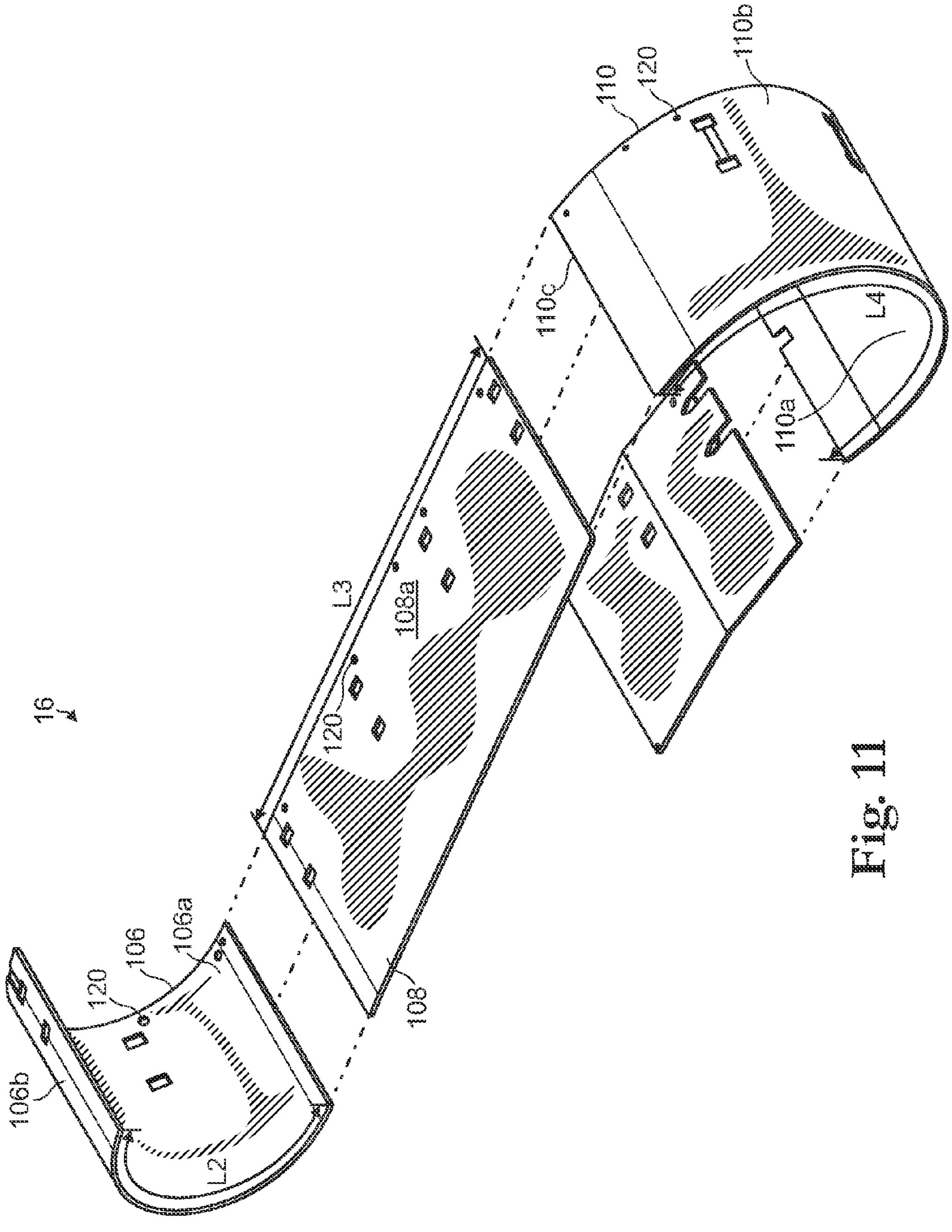
FIG. 11 is an exploded perspective view of the S-curve ballot transport path shown in FIG. 10.

Referring to FIGS. 10 and 11, first curve section 106 has a first surface 106*a* and a second surface 106*b*, planar section 108 has a first surface 108*a* and a second surface 108*b*, and second curve section 110 has a first surface 110*a* and a second surface 110*b*. It should be understood that a ballot passes over first surfaces 106*a*, 108*a* and 110*a* as it moves along transport path 16. First and second curved sections 106 and 110 are each configured to change the direction of a ballot's movement by approximately 180 degrees. Preferably, system 10 transports a ballot through transport path 16 at a speed of between approximately 50 to 120 inches per second, more preferably at a speed of between approximately 70 to 100 inches per second, and most preferably at a speed of approximately 85 inches per second.

The S-shaped configuration of transport path 16 allows the system to be relatively compact. As shown in FIG. 11, the are section length L2 of first curve section 106 is preferably between approximately 10 to 20 inches, and most preferably approximately 14 inches. The length L3 of planar section 108 is preferably between approximately 15 to 30 inches, and most preferably approximately 23 inches. The are section length L4 of second curve section 110 is preferably between approximately 15 to 25 inches, and most preferably approximately 22 inches. Thus, the sum of the lengths L2, L3 and L4 is between approximately 40 to 75 inches, more preferably between approximately 50 to 70 inches, and most preferably approximately 60 inches. Also, the height H2 of transport path 16 is preferably between approximately 10 to 20 inches, and most preferably approximately 16 inches.

First curve section 106, planar section 108 and second curve section 110 each have a plurality of mounting holes, one of which is shown as reference numeral 120 in FIG. 11, that extend from the respective first surfaces 106*a*, 108*a* and 110*a* to the respective second surfaces 106*b*, 108*b* and 110*b*. Each of the mounting holes 120 corresponds with a mount, one of which is shown as reference numeral 122 in FIG. 12, that extends outwardly from backplane 56. The mount 122 has a hole 124 that aligns with one of the mounting holes 120 in first curve section 106, planar section 108 or second curve section 110. To secure first curve section 106, planar section 108 and second curve section 110 to back plane 56, a fastener (not shown) is inserted into the hole 120 from the first surface 106*a*, 108*a* and 110*a* into the hole 124 in the mount 122. Preferably, the fastener and the hole 124 in the mount 122 are threaded, and each of the holes 120 are countersunk on the first surfaces 106*a*, 108*a*, and 110*a* so that the head of the fastener does not protrude above the surface and interfere with a ballot passing through the transport path. Although first curve section 106, planar section 108 and second curve section 110 are preferably mounted to backplane 56 as described above, it is within the scope of the invention to utilize other mounting devices as is known in the art.

Referring to FIG. 10, there is a paper guide system 117 that mounts to back plane 56 and that is spaced a distance above the first surface 108*a* of planar section 108. Paper guide system 117 preferably mounts to backplane 56 in a similar manner as planar section 108. Paper guide system is not shown in FIG. 11 for clarity. Paper guide system 117 ensures that a ballot maintains close contact with surfaces 108*a* and 110*a* as the ballot transitions from planar section 108 to second curve section 110.

Paper guide system 117 consists of a triangular-shaped plate 119, two runners 121*a* and 121*b*, and mounting brackets, one of which is shown as reference numeral 123. The mounting brackets attach to backplane 56 and each of runners 121*a* and 121*b* to space them apart a desirable distance. Two of the mounting brackets also attach t triangular plate 119 so as to mount it to backplane 56. Each runner 121*a* and 121*b* includes a front section 125*a* and 125*b* which is angled upward from the main section of the runner in order to facilitate the transition of a ballot from first curve section 106 to planar section 108 and to prevent a ballot from becoming jammed on runners 121*a* and 121*b*. Triangular plate 119 has a narrow front section 119*a* that transitions into a wider rear section 119*b* adjacent second curve section 110. Rear section 119*b* of triangular plate 119 has approximately the same width as a ballot passing through transport path 16. Rear section 119*b* is designed to prevent the outside edge of a ballot from raising up and striking a leading edge 110*c* of second curve section 110 as the ballot transitions from planar section 108 into second curve section 110.

A plurality of rollers, one of which is shown as reference numeral 54 in FIG. 1, are spaced along imaging area 14 and transport path 16 to transport a ballot to diverter 18. The rollers are designed so that the edge of each ballot is not in constant contact with backplane 56. Specifically, a ballot transported through the system is spaced approximately 1/16 of an inch from backplane 56, as discussed above, in order to prevent the ballot's edge from fraying.

Two of the sets of rollers are shown in FIG. 5 as reference numerals 136 and 138. Each set of rollers consists of a top roller 136*a*, 138*a* that contacts the top of a ballot, and a bottom roller 136*b*, 138*b* that contacts the bottom of the ballot. Bottom rollers 136*b* and 138*b* protrude upward through generally rectangular-shaped apertures 140, 142 in housing 42*b*. Rollers 136 are positioned generally adjacent backplane 56, while rollers 138 are spaced a distance from backplane 56 such that they are positioned generally adjacent the center of a ballot passing through the rollers. As shown in FIGS. 10 and 11, there are similar pairs of openings in transport path 16 for receiving rollers having a similar configuration as rollers 136, 138. As shown in FIG. 5, there are sets of triple rollers 144*a*, 144*b*, 144*c*, 144*d*, 144*e*, and 144*f* on each side of camera 46 in imaging area 14. Because at least two sets of dual rollers are in contact with a ballot at all times, the ballot maintains its correct alignment (which is first established by backplane input section 56*a*) throughout the imaging area 14 and transport path 16. Of course, it is within the scope of the invention to use more or fewer sets of rollers. It is also within the scope of the present invention for the rollers to be replaced by a belt drive system as is known in the art.

Figure 12:
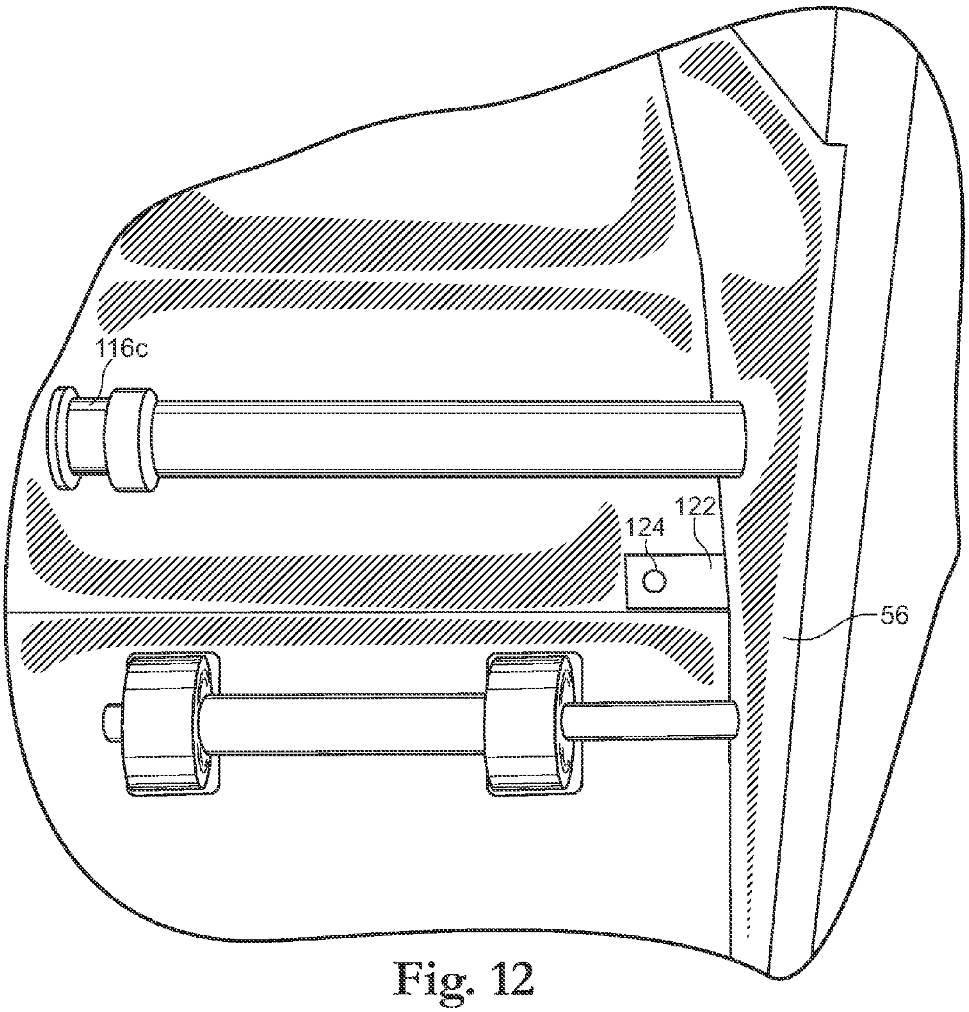
FIG. 12 is a close-up view of a mount of the S-curve ballot transport path shown in FIG. 10.

Protective cover mounts 116*a* and 116*b* (FIG. 2) are preferably provided on back plane 56 for mounting a protective cover (not shown) over the rollers and sensors beneath planar section 108 and above curved section 110. A protective cover mount 116*c* that is similar to mounts 116*a* and 116*b* is shown in FIG. 12. A protective cover 118, shown in FIG. 2, is mounted to backplane 56 with mounts similar to mounts 116*a-c* for protecting rollers along transport path 16. There is another protective cover (not shown) that mounts to back plane 56 with mounts similar to mounts 116*a-c* to the right of second curve section 110 when viewed as in FIG. 2.

While the exemplary embodiment includes a transport path having an S-shaped configuration, one skilled in the art will understand that other configurations could be used in accordance with the present invention. For example, the transport path could have a configuration consisting of two, four or even six S-shaped paths connected together. Preferably, the transport path contains an even number of curved sections so that the input and output bins are located on opposite sides of the device. This configuration will provide the optimal workflow so that workers loading ballots into the input bin and workers removing processed ballots from the output bins do not cross paths or accidentally grab a stack of ballots from the wrong bin.

Output Area

Figure 7:
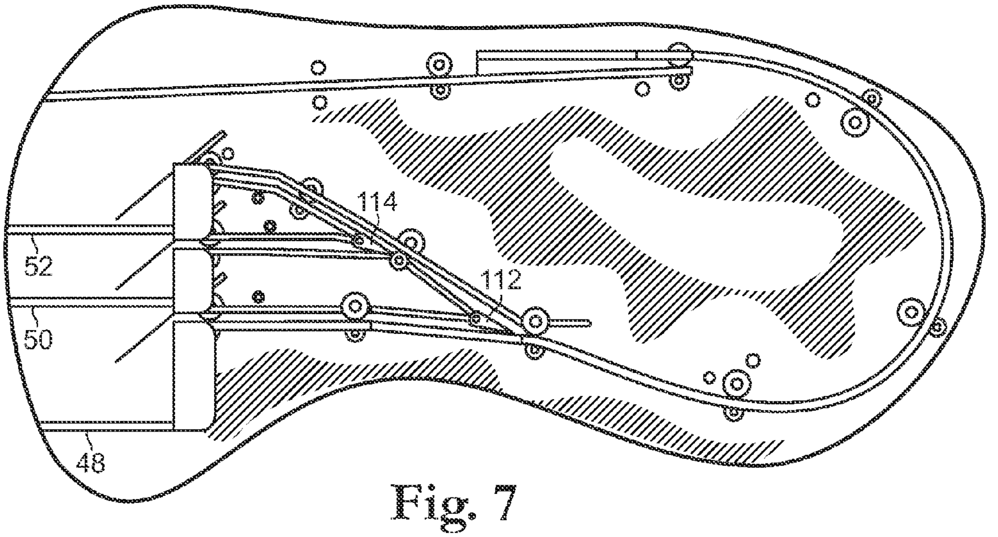
FIG. 7 is a close-up view of a ballot diverter of the system of FIG. 1 showing shunts in a first position.
Figure 8:
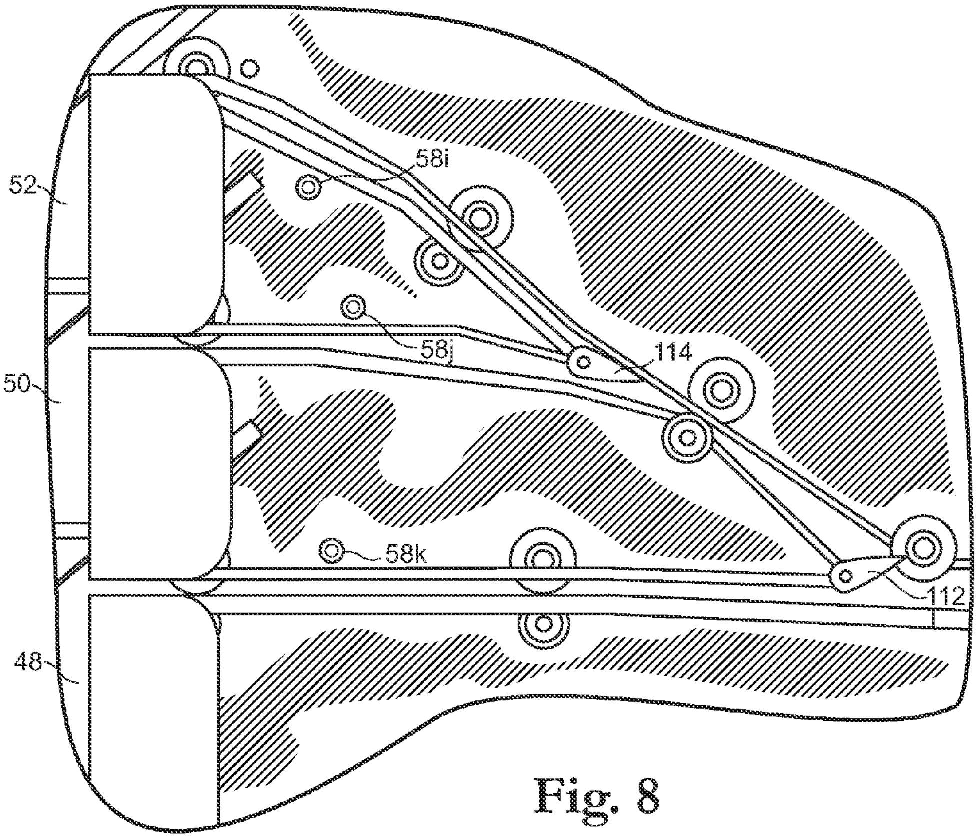
FIG. 8 is a close-up view of the ballot diverter of the system of FIG. 1 showing shunts in a second position.

Referring to FIGS. 7 and 8, output area 14 includes a diverter 18 that includes two shunts 112 and 114 that are pivotable to direct a ballot into one of three output bins 48, 50 or 52. When shunt 112 is in its first position, as shown in FIG. 7, it directs a ballot upward away from the lower output bin 48. When shunt 114 is in its first position, as shown in FIG. 7, it directs a ballot upward away from the middle output bin 50. Thus, when shunts 112 and 114 are in the positions shown in FIG. 7, ballots are directed into the upper output bin 52. If shunt 114 is pivoted upward into its second position, as shown in FIG. 8, and shunt 112 remains as shown in FIG. 7, then a ballot is directed into middle output bin 50. If shunt 112 is pivoted upward into its second position, as shown in FIG. 8, then a ballot is directed into the lower output bin 48. As shown in FIG. 2, the length L5 of diverter 18 is preferably between approximately 8 to 15 inches, and most preferably approximately 12 inches.

System 10 diverts a ballot into output bins 48, 50 or 52 (FIG. 1) based on the processing of the ballot. For example, a ballot that is properly marked by a voter and properly scanned by the system may be defined as a "scanned" ballot and diverted to output bin 48; a ballot that has one or more write-in votes may be defined as a "write-in" ballot and diverted to output bin 50, and a ballot that was improperly marked by a voter (e.g., containing one or more under-votes, over-votes and/or blank contests) or improperly scanned (e.g., unclear image and/or multiple ballots scanned at one time) may be defined as a "not scanned" ballot and diverted to output bin 52. The system is preferably configured so that each of these types of ballots may be diverted into a different output bin 48, 50, or 52. Of course, one skilled in the art will understand that the "scanned," "write-in" and "not scanned" definitions are merely examples, and that the system 10 could be configured to divert ballots into output bins 48, 50, and 52 based on other defined criteria.

The following is a non-exhaustive list of different ballot types that the system may be programmed to recognize and divert into a specific output bin:

A. Good Scans: ballots that were voted and scanned properly.

B. Write-In Ballots: ballots having a write-in vote for at least one contest.

C. Bad Scans: ballots having an unclear document image and/or that were improperly scanned due to an interruption.

D. Multiple Ballots: ballots that entered the imaging area with another ballot thereby blocking the system's ability to capture simultaneous images of the ballot with the upper and lower cameras.

E. Blank Ballots: ballots having no votes.

F. Over-Voted Ballots: ballots having at least one contest with more than the allowable number of votes.

G. Under-Voted Ballots: ballots having at least one contest with less than the allowable number of votes.

H. Crossover Votes: ballots having votes in contests for more than two political parties where the ballot contains the contests for each political party in a primary election and the voter is only allowed to vote for one of those political parties.

Preferably, in accordance with the descriptions above, "Good Scans" are directed to output bin 48, "Write-In Ballots" are directed to output bin 50, and ballots defined by one of the conditions defined in C-H above are directed to output bin 52.

The bottom output bin 48 is moveable via a screw actuator 59 (FIG. 9) to facilitate access to the ballots in the bin and to reduce the free fall time of a ballot as it moves from diverter 18 to output bin 48. Preferably, output bin 48 moves downward after a batch of ballots has been scanned for removal of the scanned ballots and upward before the system scans a batch of ballots for reception of the scanned ballots. When output bin 48 is in its upward position (shown in FIG. 1 in dashed lines) it prevents folded ballots from catching on the raised fold lines of the previous ballot deposited in the bin.

Figure 6:
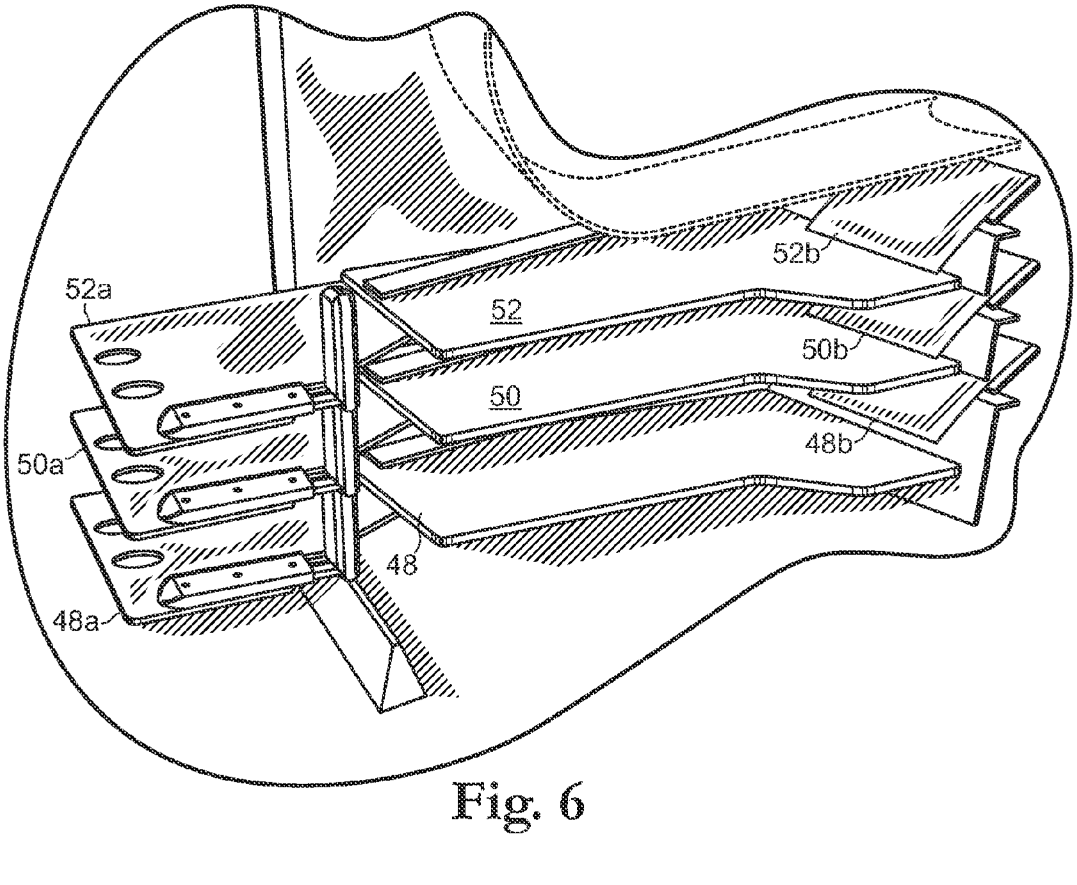
FIG. 6 is a close-up view of output bins of the system of FIG. 1.

As shown in FIG. 6, each output bin also has an extension tray 48*a*, 50*a* and 52*a* so that the output bins can receive larger ballots. Each output bin also has a ballot deflector 48*b*, 50*b* and 52*b* to prevent the trailing edge of a ballot deposited in one of the bins from catching the prevailing edge of the next ballot being deposited in the bin. The ballot deflectors 48*b*, 50*b* and 52*b* also reduce the free fall time of a ballot as it drops from diverter 18 to its respective output bin 48, 50 and 52 by supporting the ballot as it moves from diverter 18 to output bin 48, 50 and 52.

As shown in FIGS. 22, 23A-23B and 24, system 10 is capable of producing an output bin report that lists the contents of one or more of the output bins. The "Ballots Scanned Report" of FIG. 22 is an exemplary output bin report that contains information relating to the ballots that were voted and scanned properly (which were directed to lower output bin 48). The "Ballots with Write Ins Report" of FIGS. 23A-23B is an exemplary output bin report that contains information relating to the ballots that included one or more write-in votes (which were directed to middle output bin 50). The "Ballots Not Scanned Report" of FIG. 24 is an exemplary output bin report that contains information relating to the ballots that were either improperly voted or improperly scanned (which were directed to upper output bin 52).

As can be seen, the "Ballots Scanned Report" of FIG. 22 lists the Jurisdiction Name, Election Name, Election Date, Batch #, Total Ballots Scanned, Ballot # Range, and time and date when the batch was started and completed. The report also lists, by precinct, the total number of ballots that were properly voted and scanned. The "Ballots with Write Ins Report" of FIGS. 23A-23B also lists the Jurisdiction Name, Election Name, Election Date, Batch #, Ballot # Range, and time and date when the batch was started and completed, as well as the total number of ballots with write-in votes. The report lists by ballot identification number the number of write-ins votes that the ballot contains and which contests on the ballot contain the write-ins votes. For example, the report of FIG. 23A shows that Ballot #001258 contained a write-in vote for two contests, namely, the Presidential and Mayoral contests.

The "Ballots Not Scanned Report" of FIG. 24 also lists the Jurisdiction Name, Election Name, Election Date, Batch #, Ballot # Range, and time and date when the batch was started and completed. In addition, the report lists the total number of ballots that were not scanned or voted properly. For each ballot that was improperly scanned or voted, the report lists by ballot identification number the reason why the ballot was rejected and, if applicable, the specific contest containing the error. For example, the report of FIG. 24 shows that Ballot #001258 was improperly voted because of an "Overvote" in the Presidential contest, while Ballot #001489 was improperly scanned because of a "Read Error."

These reports assist an election adjudication team tasked with reviewing the results of an election, because they allow the team to easily determine which ballots need to be reviewed and the reason or reasons why those ballots need to be reviewed. Further, the output bin reports identify by ballot identification number which ballots have write-in votes and errors to assist in locating the particular ballots that need to be reviewed. In the exemplary embodiment, the ballot identification number comprises the unique red identification number printed on the ballot by ink cartridge 104, as described above. As such, the color marking printed by ink cartridge 104 corresponds with the ballot identification number referenced on the output bin reports. The output bin reports may be printed by one of printers 76 and 77, described below.

Referring to FIGS. 2 and 8, ballots moving through the system are tracked through the use of through-beam light sensors 58*a*-58*k* positioned along the input area 12, transport path 16 and output area 20 so that any particular ballot is able to be sensed by at least one of the sensors. Although FIGS. 2 and 8 show eleven sensors 58*a*-58*k*, it is within the scope of the present invention for the system to incorporate more or fewer sensors than shown in the drawings. As shown in FIG. 2, sensors 58*a* and 58*b* are mounted to back plane 56 adjacent to pick-up mechanism 26. Preferably, sensor 58*a* detects when there are no more ballots in input hopper 24. Preferably, sensor 58*b* detects the trailing edge of a ballot exiting pick-up mechanism 26 so that the system knows when the next ballot can be picked from the ballot stack.

There are also through-beam light sensors positioned adjacent to input hopper 24 for determining when hopper tray 24*a* is raised to its highest position and lowered to its lowest position. These sensors allow the system to stop movement of screw actuator 182 when hopper tray 24*a* is raised to its highest position or lowered to its lowest position. Similar light sensors are also positioned adjacent to the bottom output bin 48 for determining when it is in its highest position and its lowest position.

It should be understood that system 10 described above is relatively compact compared to conventional ballot processing systems. Referring to FIG. 2, system 10 preferably has a height H1 measured from the top to the bottom of backplane 56 of between approximately 25 to 45 inches, and most preferably approximately 36 inches. Also, system 10 preferably has a width W measured from the left to the right side of backplane 56 of between approximately 30 to 50 inches, and most preferably approximately 41 inches. In addition, system 10 preferably has a depth of between approximately 15 to 35 inches, and most preferably approximately 21 inches. As such, system 10 does not occupy much space and can be moved or transported to another location with relative ease.

Figure 13:
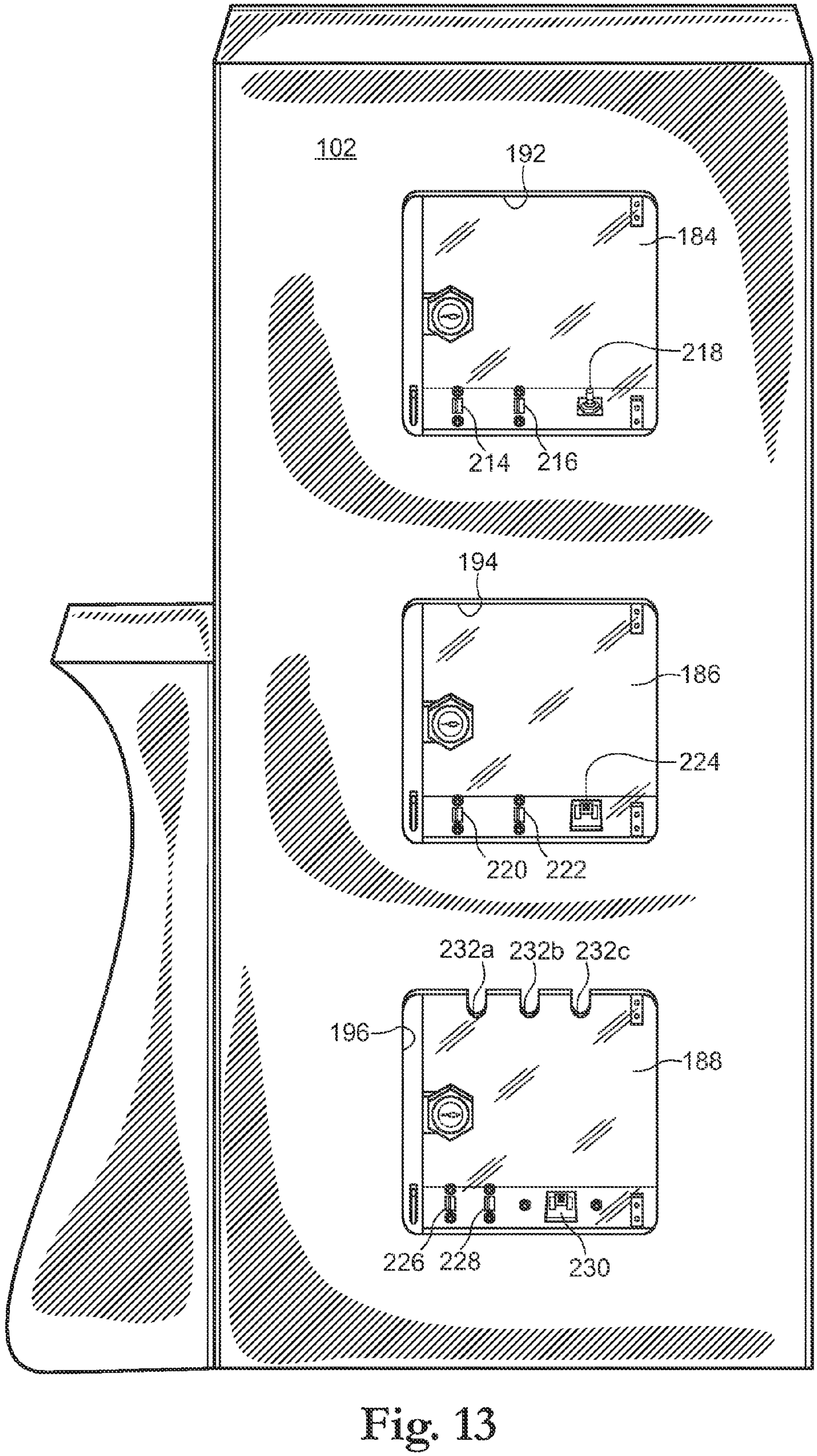
FIG. 13 is a close-up view of a side wall of the system of FIG. 1 showing transparent security doors that cover recesses in the side wall.
Figure 14:
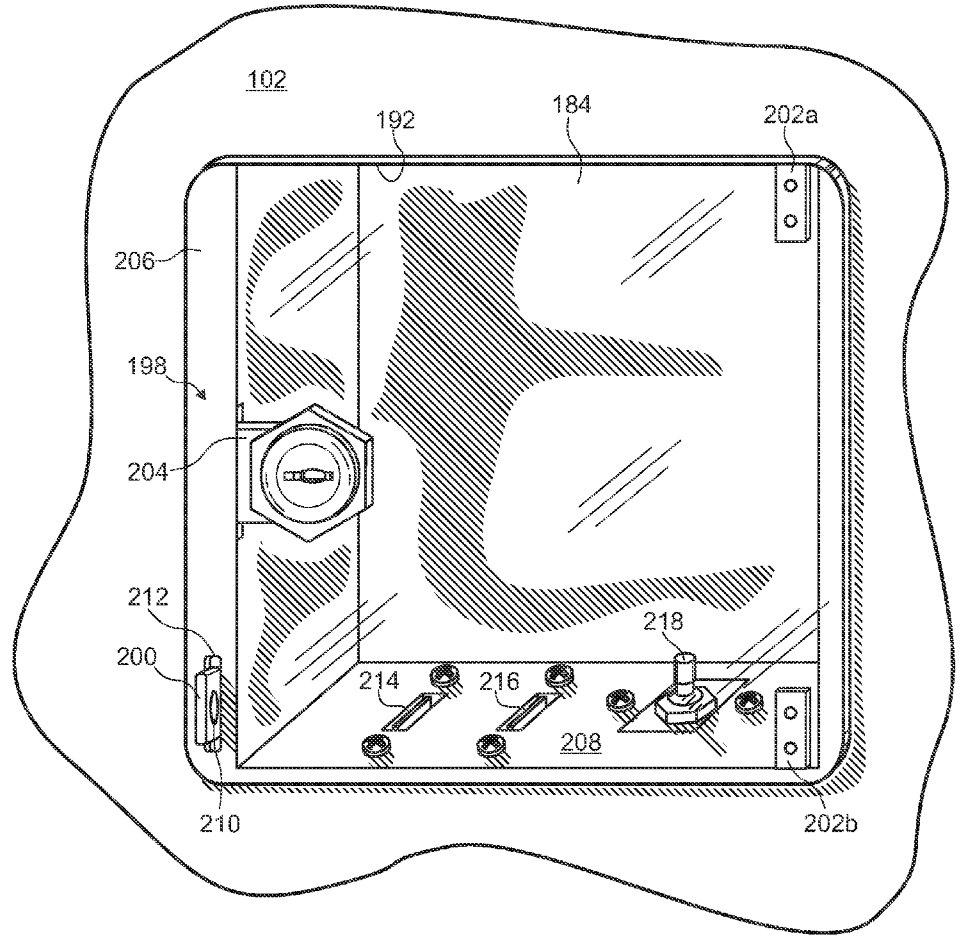
FIG. 14 is a close-up view of one of the transparent security doors shown in FIG. 13.
Figure 15:
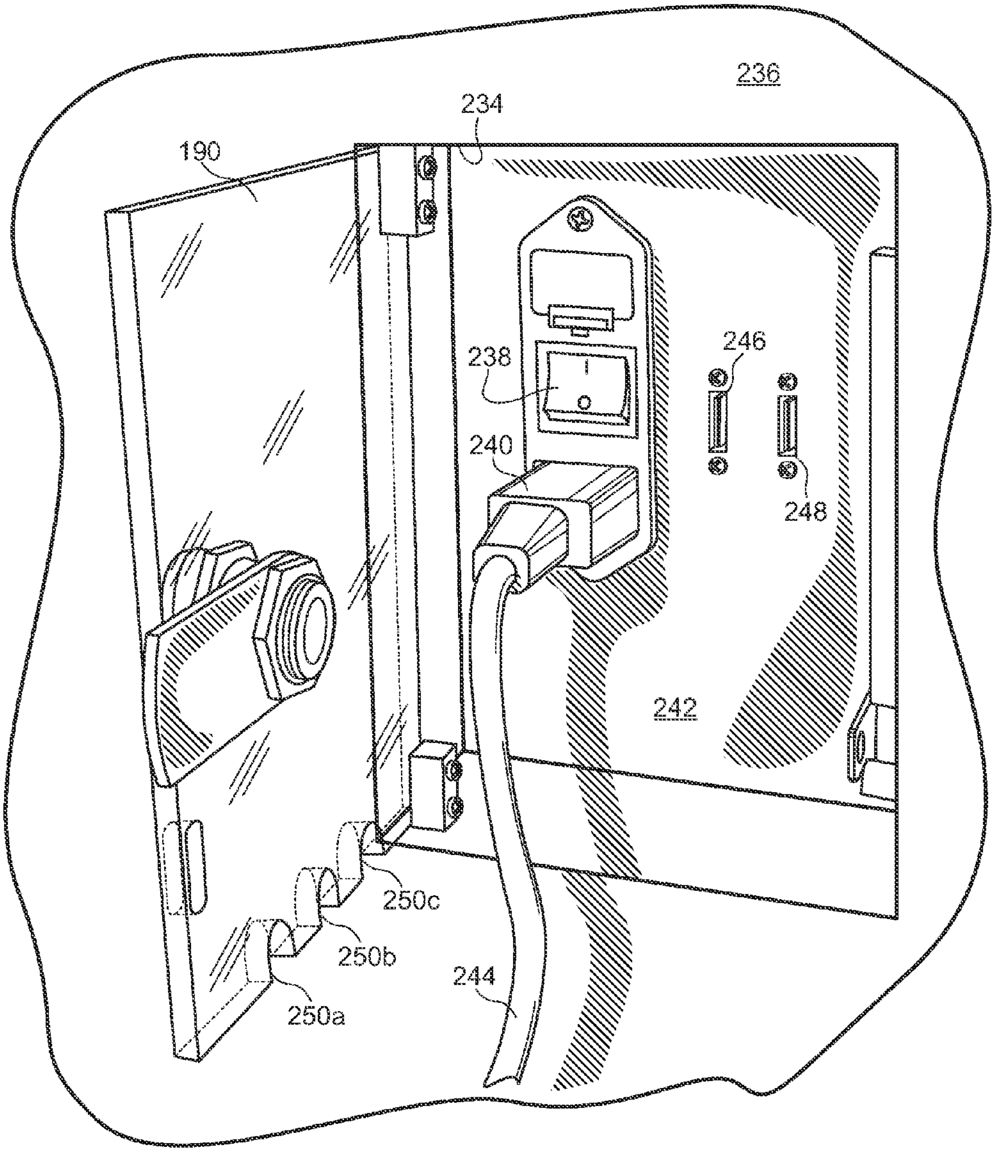
FIG. 15 is a close-up view of a power switch covered by one of the transparent security doors shown in FIG. 13.
Figure 16A:
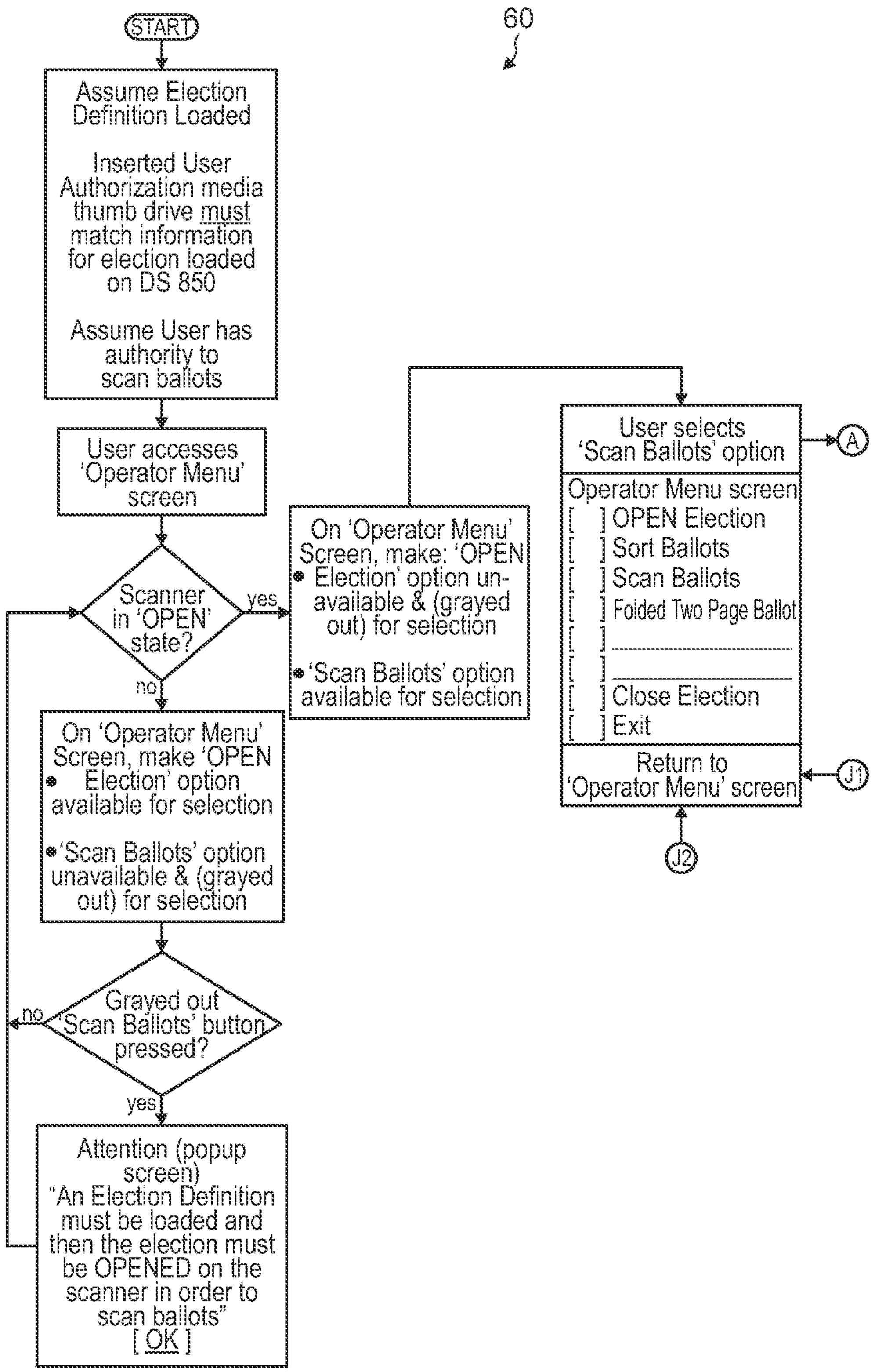
FIGS. 16A-16D are flow charts of the ballot scanning process for the system of FIG. 1.
Figure 16B:
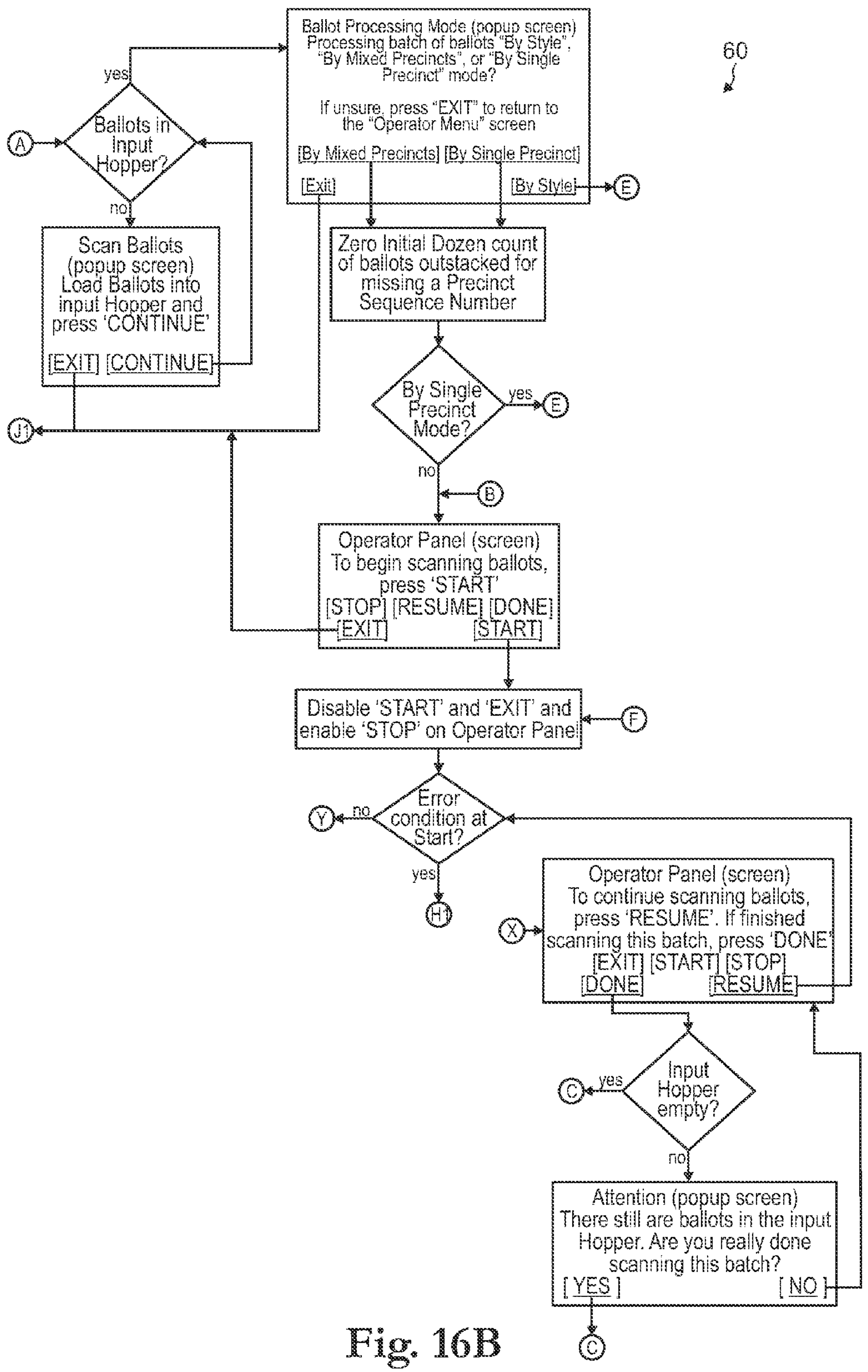
Figure 16C:
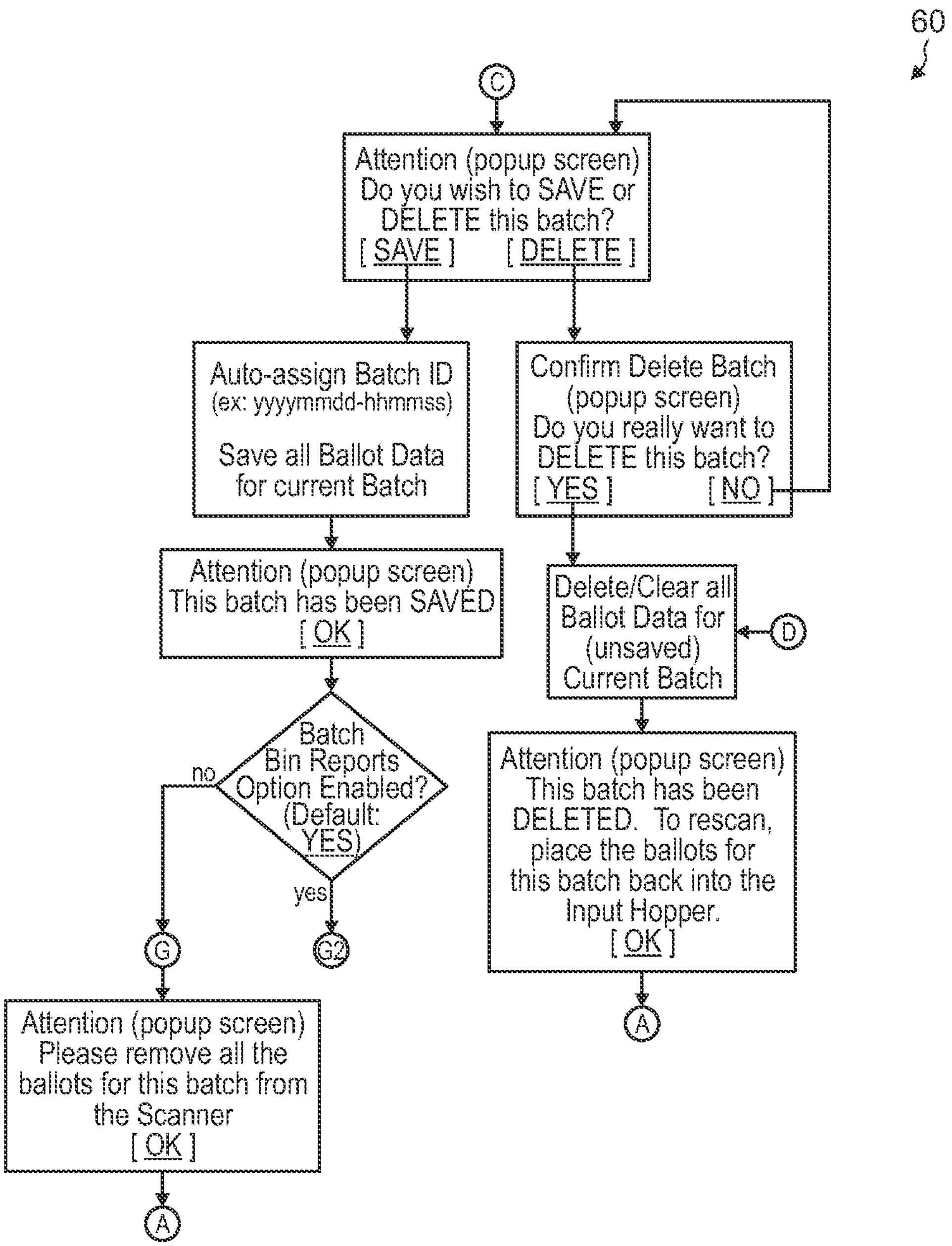
Figure 16D:
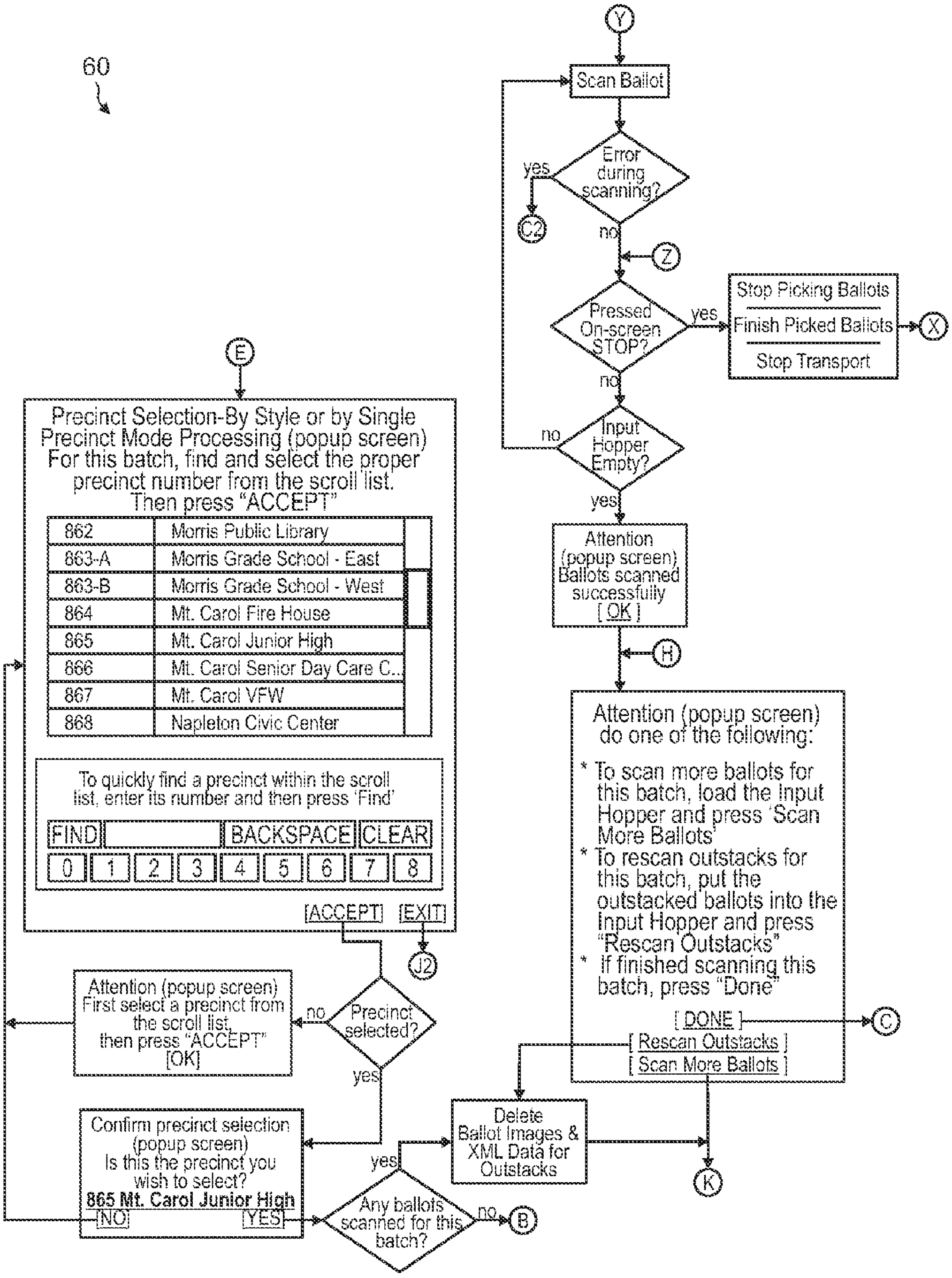

Referring to FIGS. 13-15, system 10 includes four transparent security doors 184, 186, 188 and 190 so that a user of the system can verify that all of the necessary memory devices are present and the power is turned on. Security doors 184, 186 and 188 are mounted so as to cover recesses 192, 194 and 196 formed in side wall 102 of system 10. Each transparent security door is made from a transparent material that is thick enough to prevent breaking. Preferably, each security door is made from a transparent polymeric material such as Plexiglas; however, the doors may also be made from glass. Security doors 184, 186, 188 and 190 allow election workers to install the memory devices or other items necessary for operation of the election machine, and allow the operators to verify that the devices are in place, without unlocking the doors and breaking their seals.

Because the locking mechanisms, hinges, and seal receiving structures of security doors 184, 186, 188 and 190 are substantially similar, only the locking mechanism 198, seal receiving structure 200, and hinges 202*a,b* of door 184 are described in detail herein. Locking mechanism 198 is mounted within an aperture in door 184. Locking mechanism 198 is operated by a key, which rotates a latch 204 between locked and unlocked positions. FIG. 14 shows latch 204 in its locked position, wherein latch 204 extends behind a portion 206 of side wall 102 preventing door 184 from opening. Door 184 is mounted to a bottom wall 208 with a hinge 202*b* that is secured to the door with fasteners and that is rotatably attached to bottom wall 208. The door is also mounted to a top wall opposite bottom wall 208 with a hinge 202*a* that is secured to the door and top wall in the same manner as hinge 202*b*. Seal receiving structure 200 extends outward from side wall portion 206 and has an opening 210 to receive a wire or ribbon type seal. There is an opening 212 in door 184 to receive seal receiving structure 200 when door 184 is in its closed position, as shown in FIG. 14, such that when door 184 is closed and a seal is received by structure 200, the door cannot be opened without breaking the seal.

There are two USB ports 214 and 216 mounted to bottom wall 208. There is also a switch 218 mounted to the bottom wall, which may be programmed to have any desirable function. Alternatively, switch 218 may be excluded from system 10 and replaced with additional USB ports or an RJ45 connector. USB ports 214 and 216 may receive removable memory devices, such as memory device 78 (FIG. 21), that contain information necessary for the operation of system 10. For example, one or both of ports 214 and 216 may receive a USB memory device containing the election definition, as is known in the art.

USB ports 214 and 216 may also be used to connect other devices to system 10, such as a computer mouse, keyboard, and printer. As shown in FIG. 13, there are two additional USB ports 220 and 222 and a RJ45 connector 224 mounted within recess 194 and two USB ports 226 and 228 and a RJ45 connector 230 mounted within recess 196. USB ports 220, 222, 226 and 228 may receive any of the devices described above for ports 214 and 216, while RJ45 connectors 224 and 230 may be used to connect system 10 to network 75 (FIG. 21), which could be another computer, a network of computers, and/or another ballot processing system that is identical or substantially identical to system 10 described herein. There are three slots 232*a*, 232*b* and 232*c* formed in the top of door 188 to allow cables to pass through the door when in the closed position.

Referring now to FIG. 15, door 190 is mounted to cover a recess 234 formed in a side wall 236 (FIG. 1) of the system, which is opposite side wall 102. There is a switch 238 and an electrical outlet 240 mounted to the back wall 242 that forms recess 234. Preferably, switch 238 is operable to turn the system on and off, while outlet 240 receives an electrical cord 244 that plugs into an electrical power source for providing power to the system. There are also two USB ports 246 and 248 mounted to back wall 242 that may receive any of the devices described above for ports 214 and 216. There are three slots 250*a*, 250*b* and 250*c* in the bottom of door 190 for allowing cables to pass through the door when in the closed position. The other features of door 190 are identical to those of door 184, which is described in detail above.

Figure 17A:
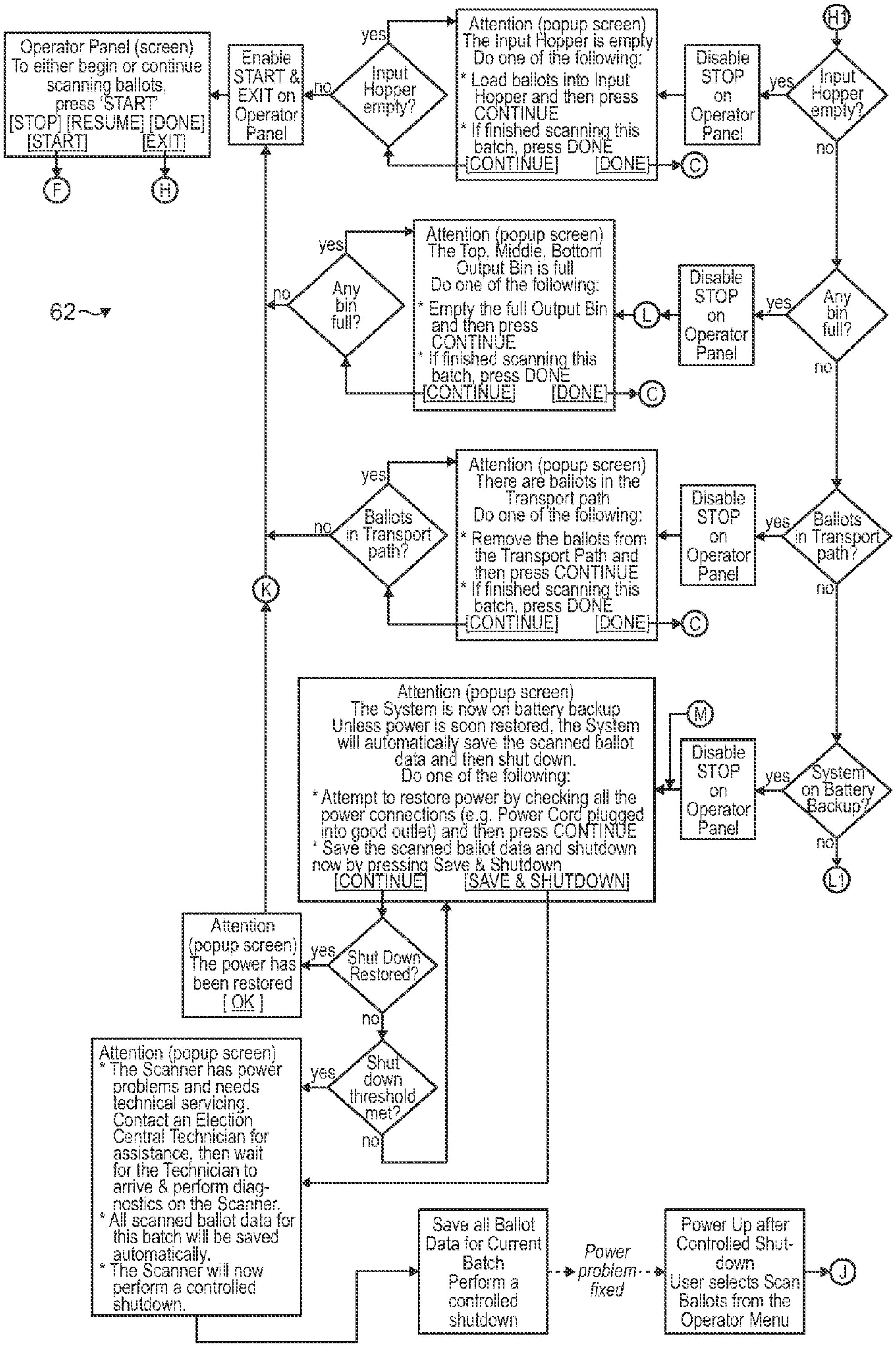
FIGS. 17A-17B are flow charts of the process for resolving start error conditions for the system of FIG. 1.
Figure 17B:
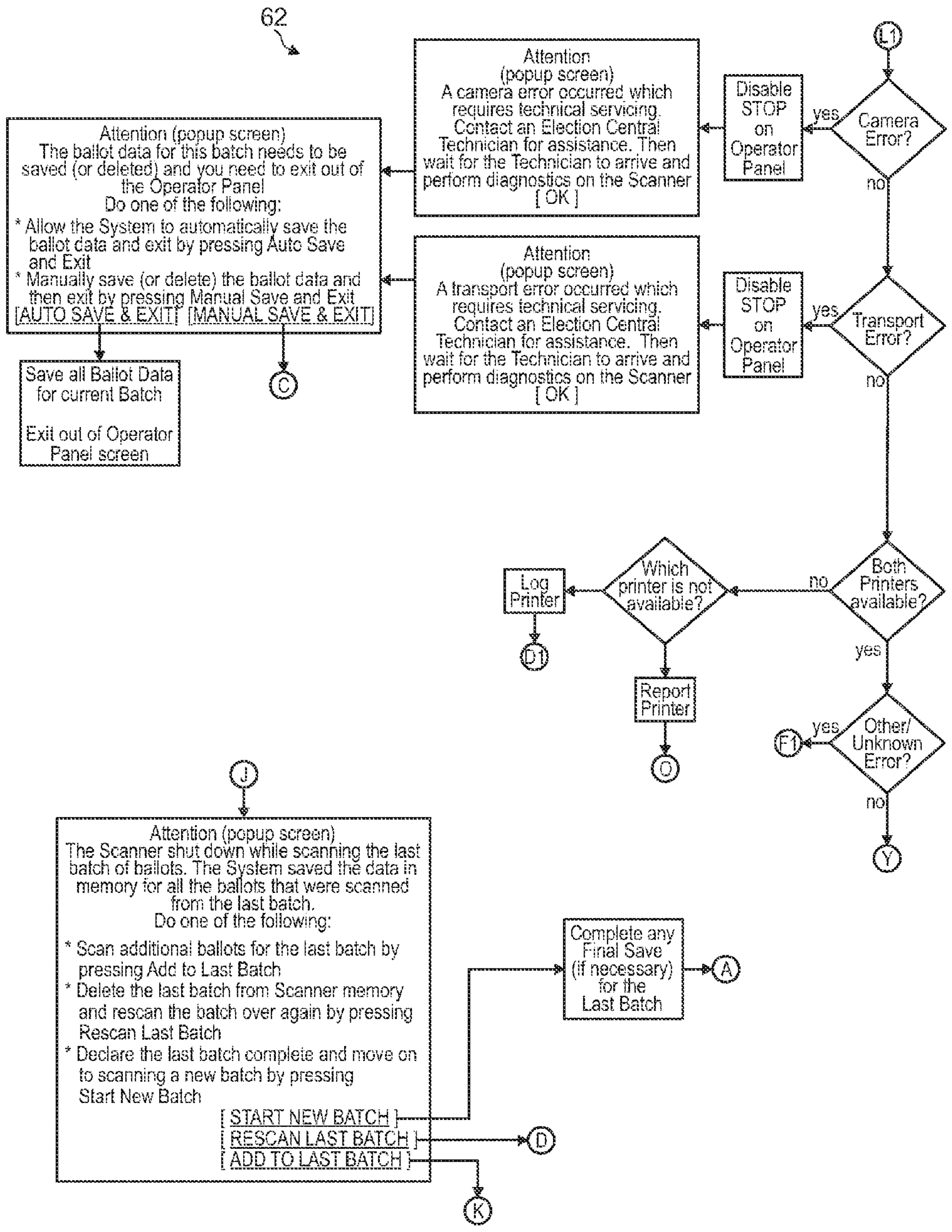
Figure 18A:
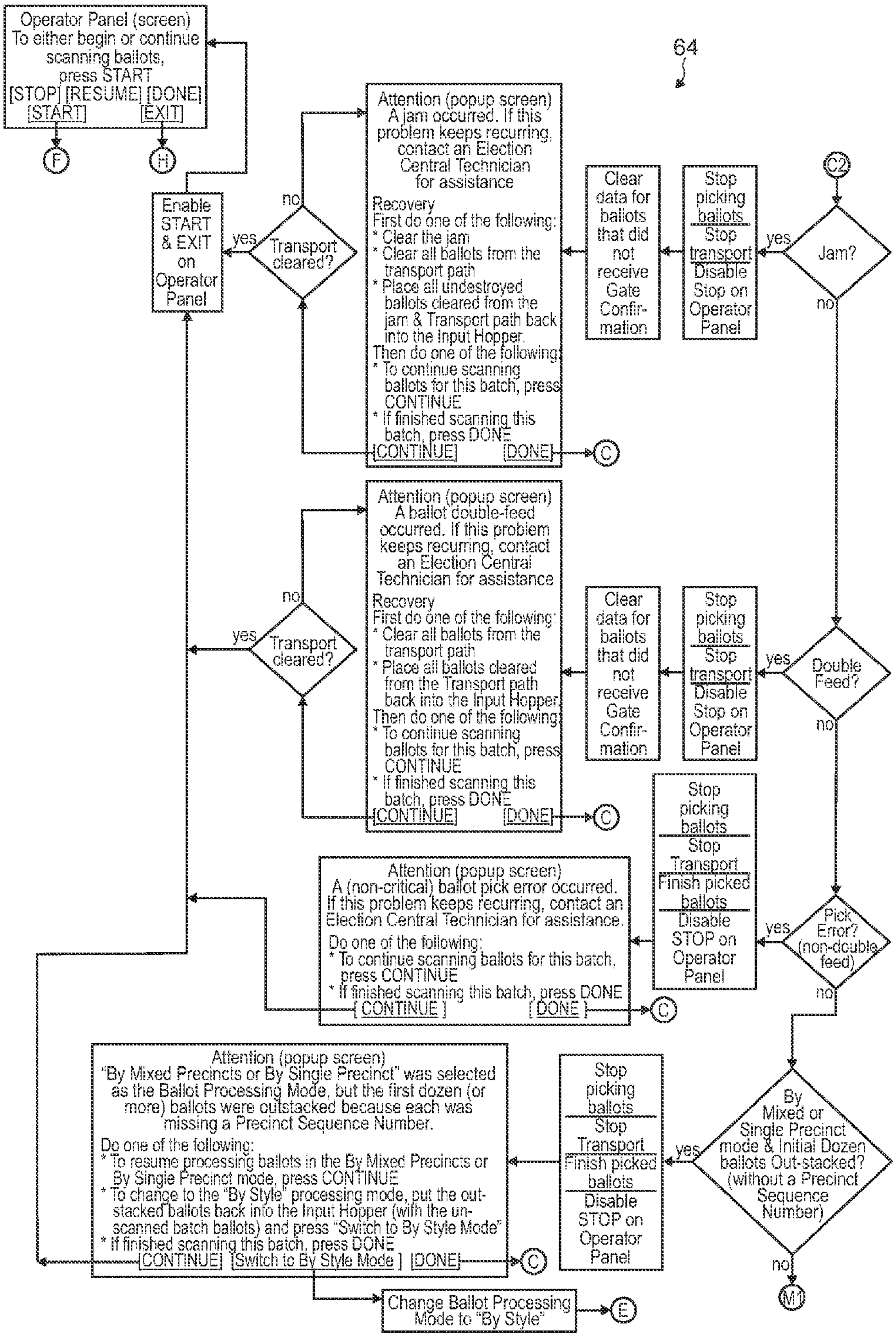
FIGS. 18A-18B are flow charts of the process for resolving scanning error conditions and the process for printing batch bin reports for the system of FIG. 1.
Figure 18B:
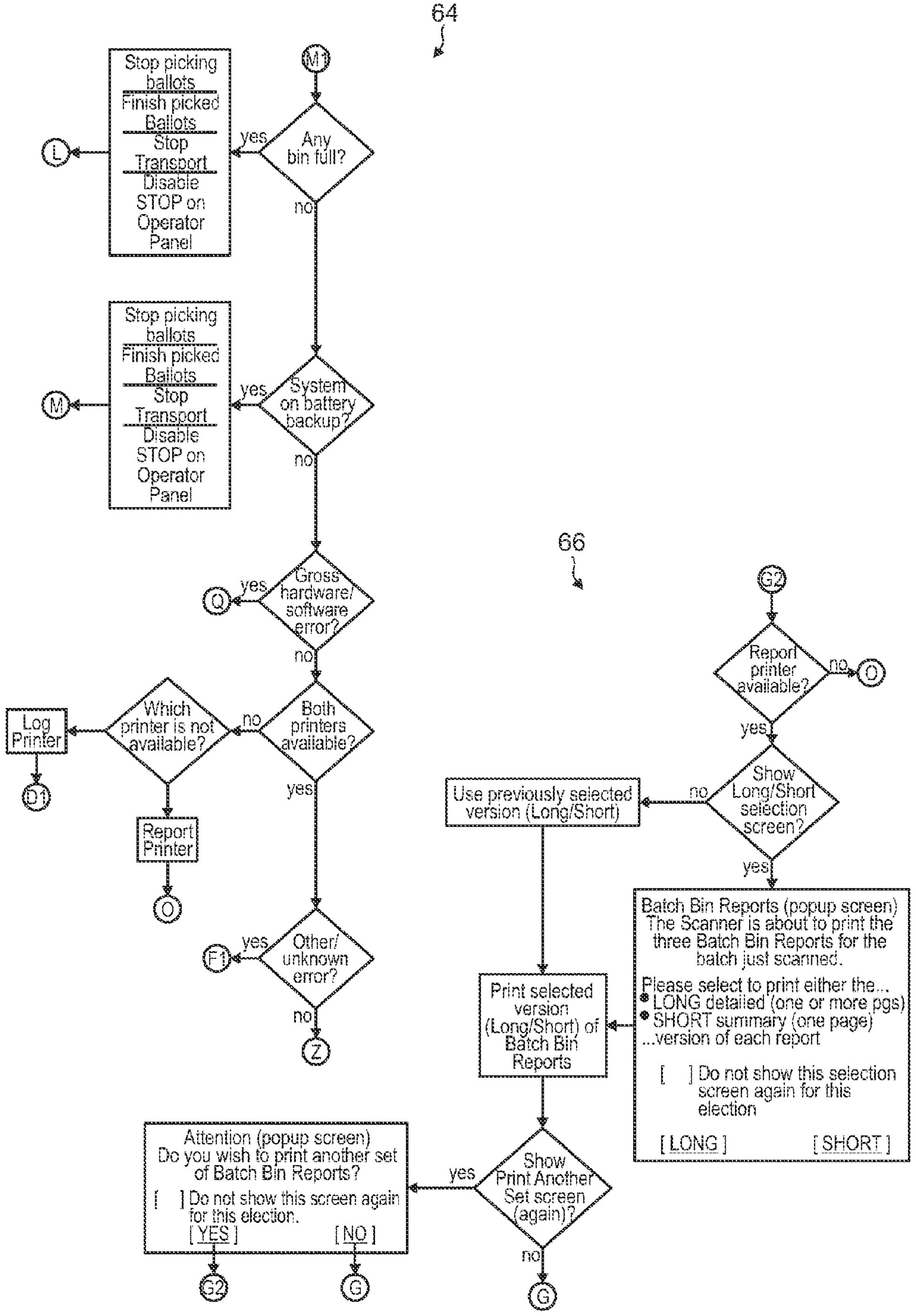
Figure 19A:
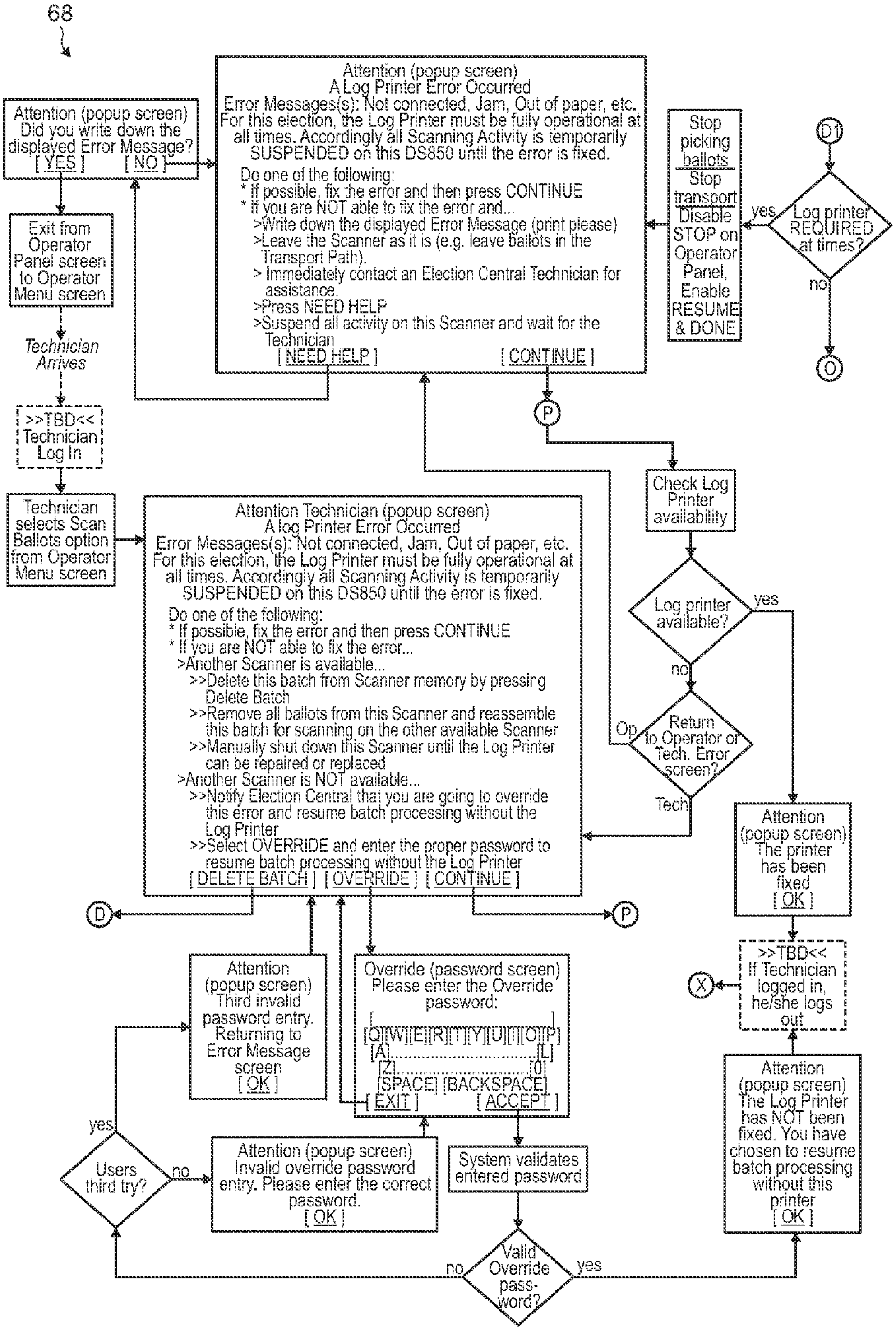
FIGS. 19A-19B are flow charts of the process for resolving the situation when the log/report printer is not available for the system of FIG. 1.
Figure 19B:
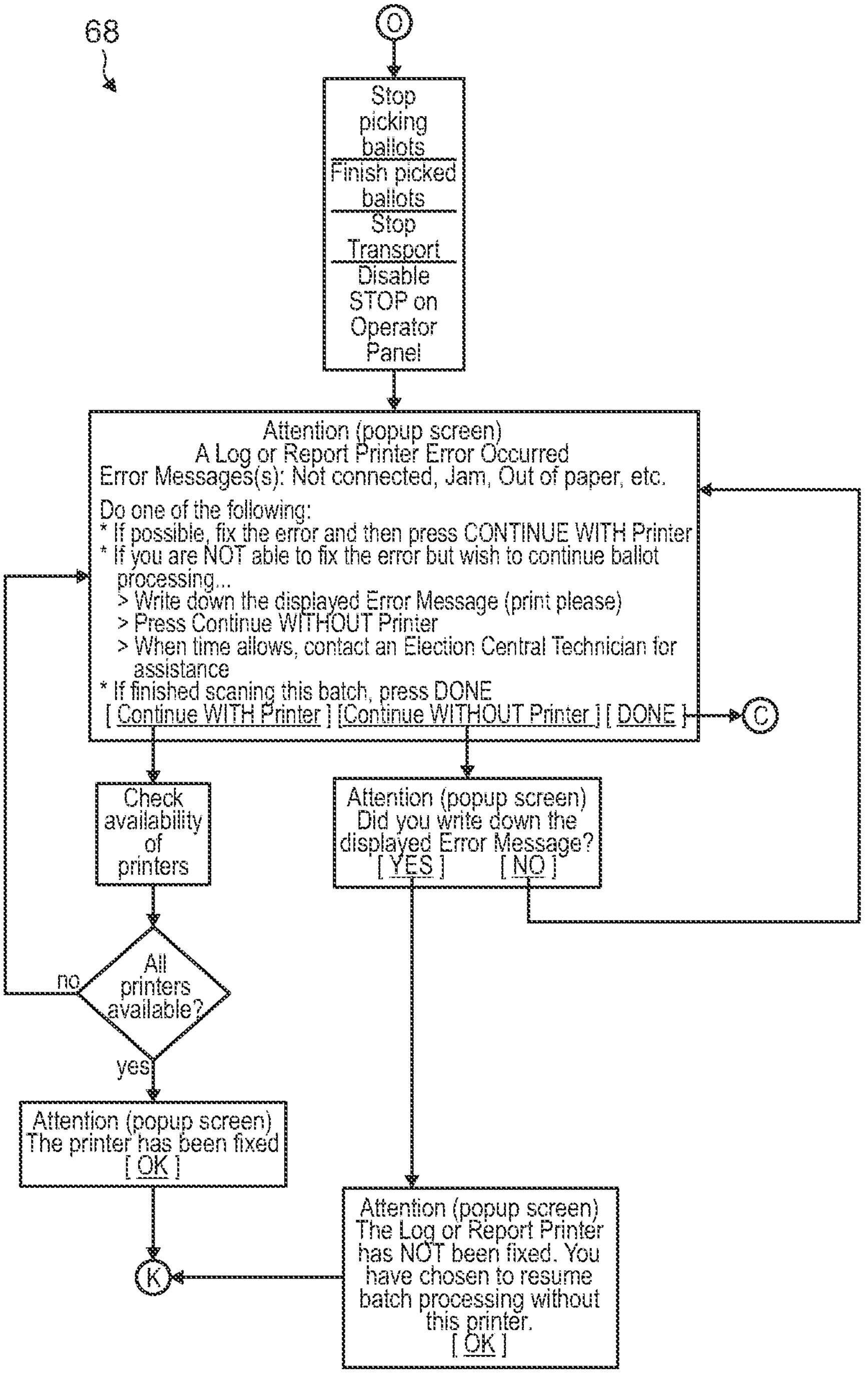
Figure 20:
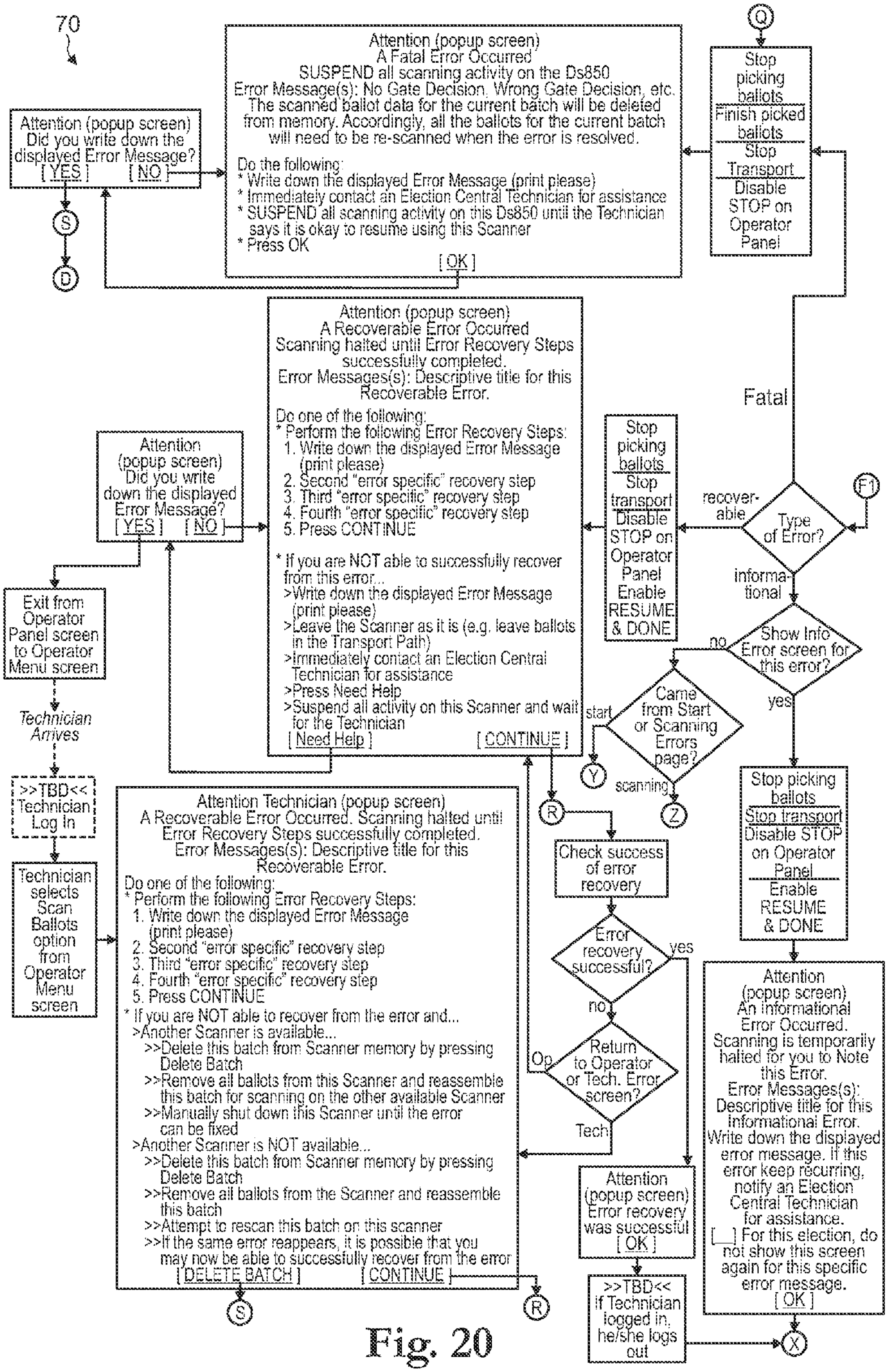
FIG. 20 is a flow chart of the process for resolving an unknown error for the system of FIG. 1.

Referring now to FIGS. 16A-16D, 17A-17B, 18A-18B. 19A-1913 and 20, various flow charts are provided to illustrate the functionality of the application software of system 10 in connection with the processing of ballots as described herein. These flow charts also show the display screens that are displayed on user input device 22 at various times during the processing of a ballot. Specifically, FIGS. 16A-16D show a flow chart 60 of the ballot scanning process of system 10. FIGS. 17A-17B show a flow chart 62 of the process for resolving start error conditions for system 10. FIGS. 18A-18B show a flow chart 64 of the process for resolving scanning error conditions for system 10. FIG. 18B shows a flow chart 66 of the process for printing output bin reports for system 10. FIGS. 19A-19B show a flow chart 68 of the process for resolving the situation when a log printer or report printer is not available for system 10. FIG. 20 shows a flow chart 70 of the process for resolving an unknown error for system 10.

Figure 21:
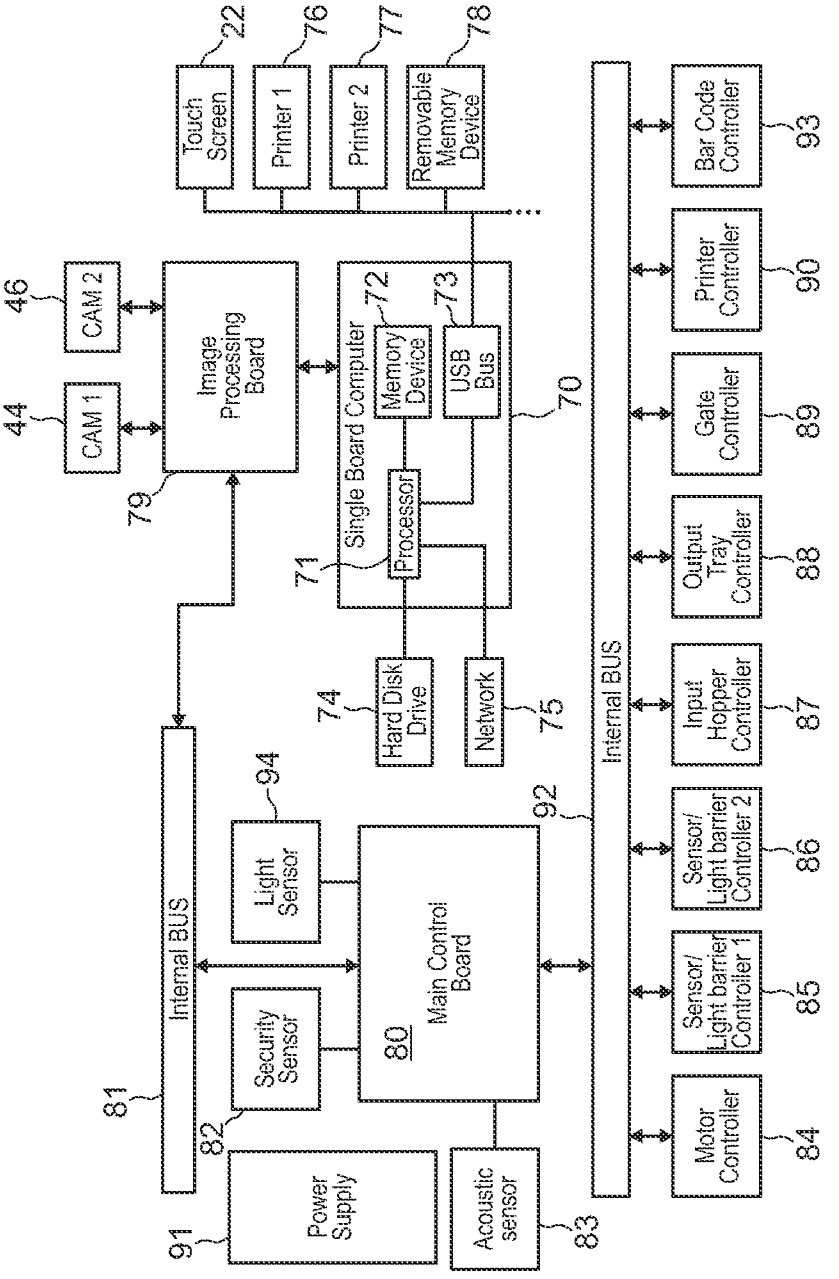
FIG. 21 is a block diagram of computer processors and controllers of the system of FIG. 1.

Referring now to FIG. 21, a block diagram is provided of the hardware incorporated into system 10. As can be seen, system 10 includes a single board computer 70 with a processor 71 connected to a memory device 72, which is preferably random access memory (RAM), and a USB bus 73. The processor 71 is also connected to a hard disk drive 74 and, if desired, may be connected to a network 75 of other computers. The USB bus 73 is connected to a user input device/touch screen 22, a first printer 76, a second printer 77, and a removable memory device 78. The printers 76 and 77 may be used to print a wide variety of system and diagnostic reports, including the output bin reports shown in FIGS. 22-24. In the exemplary embodiment, one of the printers is a continuous feed dot matrix printer for printing an audit log, and the other is a cut-sheet laser printer for printing reports. Other devices may also connect to the USB bus 73 if desired. The hard disk drive 74 preferably stores the application software that is executed by processor 71 to perform the various functions of system 10 described herein.

The single board computer 70 is connected to an image processing board 79 via a USB connection that communicates with two cameras 44 and 46. The image processing board 79 transfers the ballot images to the single board computer 70, which stores them on hard disk drive 74. The memory device 72 may also be used to temporarily store data before it is transferred to hard disk drive 74. The election definition is preferably transferred to the single board computer 70 via the removable memory device 78 and stored on hard disk drive 74. The removable memory device 78 preferably connects to the USB bus 73 through one of the USB ports described above and shown in FIGS. 13-15.

The image processing board 79 is connected to a main control board 80 via an internal bus 81. The main control board 80 is connected to the following controllers via an internal bus 92: a motor controller 84, a first sensor/light barrier controller 85, a second sensor/light harrier controller 86, an input hopper controller 87, an output tray controller 88, a gate controller 89, a printer controller 90, and a bar code controller 93. The main control board 80 also monitors the full sensors of output trays 50 and 52.

The motor controller 84 is connected to a main motor 148 (FIG. 9), which provides power to the rollers and to a pinwheel sensor that detects whether main motor 148 is operating correctly. The first and second sensor/light barrier controllers 85 and 86 are each connected to one or more of sensors 58*a*-58*k*. The input hopper controller 87 is connected to screw actuator 182 (FIG. 9) for moving input hopper 24 as described above, and also monitors the maximum up and down position sensors for this tray. The output tray controller 88 is connected to screw actuator 59 (FIG. 9) for moving the lower output tray 48, and also monitors the maximum up and down position sensors for this tray. The gate controller 89 is connected to the clutch on flywheel 40 for controlling the rate at which ballots are picked from the ballot stack by pick-up mechanism 26. The gate controller 89 is connected to shunts 112 and 114 of diverter 18 (FIG. 8) for directing ballots into the appropriate output bin 48, 50 or 52. The printer controller 90 is connected to ink cartridge 104 (FIG. 2) for printing identifying marks on ballots scanned by system 10. The bar code controller 93 is connected to bar code scanners 450 (FIG. 2) and 452 (FIG. 5), which are discussed below in connection with the double feed detection system.

To isolate system noise, system 10 uses three separate power supplies. A first power supply is used to power the transport mechanical controls board, input and output tray motors, and the cameras. A second power supply is used to power only the main motor. A third power supply is used to power the computer motherboard, the hard drive, and the display.

The main control board 80 is connected to a security sensor 82 that is positioned within the transport path to detect copied or counterfeit ballots. Upon detection of a copied or counterfeit ballot, the main control board 80 instructs the image processing board 79 and single board computer 70 to flag that particular ballot. Acoustic and light sensors 83 and 94, respectively, are also connected to the main control board 80. These sensors are used to detect whether more than one ballot passes through imaging area 14 at the same time. These sensors are discussed in detail below in connection with the double feed detection system.

Double Feed Detection System

System 10 has a double feed detection system that is operable to detect the passage of more than one of the ballots through a detection zone at the same time so that those ballots can be redirected into the appropriate output bin 48, 50, or 52, e.g., the output bin that receives ballots which need to be rescanned. In the exemplary embodiment, the detection zone is located in imaging area 14. Of course, one skilled in the art will appreciate that the detection zone may be positioned in other locations within system 10, such as within transport path 16.

The detection system is preferably adjustable to operate in either a first mode for detecting the passage of more than one folded ballot, such as ballots 300 and 350 (FIGS. 26B and 27B), or a second mode for detecting the passage of more than one unfolded ballot, such as ballot 126 (FIG. 25). In the exemplary embodiment, the detection system is set to one of the first and second modes based on an instruction in the election definition that specifies whether system 10 will be processing folded or unfolded ballots in a particular election. When folded ballots are being processed, processor 71 reads the election definition and sets the detection system to the first mode. Conversely, when unfolded ballots are being processed, processor 71 reads the election definition and sets the detection system to the second mode. The detection system may alternatively be adjusted between the first and second modes by an operator through the use of user input device 22.

In one aspect, the detection system comprises an acoustic sensor 83 (FIGS. 2 and 21) in communication with processor 71. The acoustic sensor 83 includes an emitter mounted in upper read head housing 42*a* in the position identified as 83 in FIG. 2 and a receiver mounted in lower read head housing 42*b* opposite the emitter in the positioned identified as 454 in FIG. 5. The emitter generates and emits ultrasonic waves that are transmitted toward the ballot(s) passing through the imaging area 14. The ultrasonic waves pass through the ballot(s) and the amplitude of the waves is detected by the receiver positioned in the lower read head housing 42*b*. The amplitude of the waves that pass through the ballot(s) depends on the type and number of ballots from which the waves pass through. For example, the amplitude of sound waves passing through a single unfolded ballot, such as ballot 126, falls within a different amplitude range than the amplitude of sound waves passing through more than one unfolded ballot. Also, the amplitude of sound waves passing through a single folded ballot, such as one of ballots 300 or 350, falls within a different amplitude range than the amplitude of sound waves passing through more than one folded ballot. Typically, the amplitude of sound waves passing through more than one unfolded or folded ballot will be less than the amplitude of sound waves passing through a single unfolded or folded ballot. Instead of detecting the amplitude of sound waves passing through the ballot(s), it is also within the scope of the invention for the receiver to detect the frequency of the sound waves passing through the ballot(s).

After detecting the amplitude or frequency of the waves that pass through the ballots, the acoustic sensor 83 converts the detected amplitude or frequency into a voltage that is sent to processor 71. Processor 71 is pre-programmed with the sensor output voltage range that corresponds to a single folded ballot and with the sensor output voltage range that corresponds to a single unfolded ballot. Processor 71 compares the output voltage from acoustic sensor 83 to the sensor output voltage range that corresponds to a single folded ballot or to the sensor output voltage range that corresponds to a single unfolded ballot, depending on whether folded or unfolded ballots are being processed by system 10. If the output voltage from acoustic sensor 83 falls within the sensor output voltage range that corresponds to a single ballot (folded or unfolded, as the case may be), then it is determined that a single ballot passed through the detection zone. However, if the output voltage from acoustic sensor 83 is not within the sensor output voltage range that corresponds to a single ballot, then it is determined that more than one ballot passed through the detection zone, in which case processor 71 instructs the diverter 18 to divert the ballots into output bin 52 (i.e., the output bin designated for improperly scanned ballots).

In another aspect, detection system comprises a light sensor 94 (FIG. 21) in communication with processor 71. Light sensor 94 includes an LED light mounted in upper read head housing 42*a* and a phototransistor mounted in lower read head housing 42*b* opposite the LED light. Preferably, the LED light replaces and is positioned in the same location as the emitter of the acoustic sensor 83 in upper read head housing 42*a* (FIG. 2), and the phototransistor replaces and is positioned in the same location as the receiver of the acoustic sensor 83 in lower read head housing 42*b* in the position identified as 454 in FIG. 5. Optionally, if both acoustic sensor 83 and light sensor 94 are used in system 10, then the LED light is preferably spaced a desired distance from the emitter of acoustic sensor 83 in upper read head housing 42*a* and the phototransistor is spaced a corresponding distance from the receiver of acoustic sensor 83 in lower read head housing 42*b*.

The LED light emits light that is partially transmitted through the ballot(s) passing through the imaging area 14. The phototransistor detects the intensity of the light transmitted through the ballot(s) and converts it into a voltage that is sent to processor 71. The voltage output from the phototransistor depends on the type and number of ballots through which the light is transmitted, as less light is transmitted through more ballots. Processor 71 is pre-programmed with the sensor output voltage range that corresponds to a single folded ballot and with the sensor output voltage range that corresponds to a single unfolded ballot. Processor 71 compares the output voltage from the light sensor 94 to the sensor output voltage range that corresponds to a single folded ballot or to the sensor output voltage range that corresponds to a single unfolded ballot, depending on whether folded or unfolded ballots are being processed by system 10. If the output voltage from light sensor 94 falls within the sensor output voltage range that corresponds to a single ballot (folded or unfolded, as the case may be), then it is determined that a single ballot passed through the detection zone. However, if the output voltage from light sensor 94 is not within the sensor output voltage range that corresponds to a single ballot, then it is determined that more than one ballot passed through the detection zone, in which case processor 71 instructs the diverter 18 to divert the ballots into output bin 52 (i.e., the output bin designated for improperly scanned ballots).

In yet another aspect, the detection system comprises a pair of reading devices, such as barcode readers 450 (FIG. 2) and 452 (FIG. 5) in communication with processor 71 via barcode controller 93. Any type of barcode readers may be used, as is known in the art. Barcode readers 450 and 452 are positioned in upper and lower read head housings 42*a* and 42*b*, respectively. When folded ballot 300 (shown in FIG. 26B) passes through imaging area 14 with edge 314 adjacent to back plane 56 and first side 322 facing upper read head housing 42*a*, barcode reader 450 reads barcode 326 and barcode reader 452 reads barcode 328. When folded ballot 350 (shown in FIG. 27B) passes through imaging area 14 with folded edge 370 adjacent to back plane 56 and first side 372 facing upper read head housing 42*a*, barcode reader 450 reads barcode 376 and barcode reader 452 reads barcode 382. Of course, if ballot 350 is oriented so that edge 362 is adjacent back plane 56 and first side 372 faces upper read head housing 42*a*, barcode reader 450 reads barcode 378 and barcode reader 452 reads barcode 380. For an unfolded ballot, such as ballot 126 shown in FIG. 25, identical barcodes (not shown) would be printed on each side of the ballot in a position where they would be read by barcode readers 450 and 452 in a similar manner as described above with respect to the folded ballots.

After each of the barcode readers 450 and 452 reads a barcode, it sends data corresponding to the barcode to processor 71 which analyzes the data to determine whether the barcodes are identical. If the barcodes are identical, then it is determined that a single ballot passed through the detection zone. However, if the barcodes are different, then it is determined that more than one ballot passed through the detection zone, in which case processor 71 instructs the diverter 18 to divert the ballots into output bin 52 (i.e., the output bin designated for improperly scanned ballots).

It is within the scope of the invention for system 10 to utilize one or more of the detection systems described above (i.e., acoustic sensor 83, light sensor 94, or barcode readers 450 and 452). It is also within the scope of the invention for system 10 to utilize other types of sensors or detection systems that are operable to detect the passage of more than one ballot through a detection zone. For example, the ballots may contain identification marks other than barcodes, in which case optical character recognition (OCR) or similar technologies are used to read the identification marks. As another example, cameras 44 and 46 may function as the first and second reading devices. In this case, cameras 44 and 46 image the identification marks on the ballots and send the images to processor 71, which decodes the images to determine whether the identification marks are identical. Of course, one skilled in the art will appreciate that other types of reading devices are also possible in accordance with the present invention.

Operation of the System

In operation, a stack of ballots are placed in input hopper 24. The retardation belts 176 and 178 (FIG. 4) have preferably been adjusted with adjustment screws 442 and 444 to set the proper distance between rollers 28 and 30 and retardation belts 176 and 178, depending on whether folded or unfolded ballots are being processed in a particular election. Pick-up mechanism 26 picks the top ballot from the stack and transfers it to imaging area 14. The retardation belts 176 and 178 prevent the pick-up mechanism 26 from transferring more than one ballot at a time into the imaging area 14.

Cameras 44 and 46 image both sides of the ballot and send the ballot image to the image processing board 79 (FIG. 21). As the ballot is transported from imaging area 14 to diverter 18 through transport path 16, the image processing board 79 sends the ballot image to the single board computer 70, which temporarily stores the ballot image in memory device 72 or on hard disk drive 74. The processor 71 utilizes the election definition to process the ballot image and decode the voting selections marked on the ballot, preferably as described in U.S. Pat. No. 6,854,644, which is incorporated herein by reference. The processor 71 then creates a ballot record that contains the processing results and stores the file in either memory device 72 or hard disk drive 74 along with the ballot image. After a batch of ballots is processed, all of the ballot records and ballot images are permanently stored on hard disk drive 74 and digitally signed to ensure authenticity.

Each ballot also passes through the detection zone within imaging area 14, whereby one or more of the double feed detection systems described above detect the passage of more than one of the ballots through the detection zone at the same time. As described above, if it is determined that more than one ballot passed through the detection zone, processor 71 instructs the diverter 18 to divert the ballots into output bin 52 (i.e., the output bin designated for improperly scanned ballots).

Based on the ballot images, the processor 71 also determines which position the shunts 112 and 114 of diverter 18 need to be moved in order to divert the ballot into the appropriate output bin 48, 50 or 52. The processor 71 sends instructions to the gate controller 89 to move the shunts 112 and 114 into the appropriate position. The sensors 58*a*-58*k* (FIGS. 2 and 8) positioned along the ballot transport path are connected to the main control board 80, image processing board 79, and single board computer 70 via sensor/light barrier controllers 85 and 86 in order to track each ballot through transport path 16 and ensure that each ballot is diverted into the correct output bin 48, 50 or 52.

The above-described process repeats for each ballot in input hopper 24 as the processor 71 sends instructions through the main control board 80 to the gate controller 89, causing the electronically controlled clutch to rapidly engage and disengage flywheel 40 from drive shaft 38 to pick up ballots at the desired speed. Preferably, the ballots are transported from input hopper 24 to diverter 18 at a speed of between approximately 50 to 120 inches per second. Preferably, up to four ballots may be positioned within imaging area 14 and transport path 16 at any given time.

Finally, system 10 automatically determines whether the results of newly scanned ballots should be added to a preexisting election results database, or, whether the results of the newly scanned ballots should replace the results in the preexisting database. This determination is made based on date/time stamps that are added to every ballot record and ballot image. For every batch of scanned ballots, the system saves a date/time stamp of when the first ballot was scanned and when the last ballot was scanned to establish a session window for that batch of ballots. The date/time stamps are saved along with the machine identification in a results collection file, which is encrypted and signed to prevent tampering.

For example, if the date/time stamp of the first ballot in the newly scanned ballots is the same as the date/time stamp of the first ballot of the original results and the date/time stamp of the last ballot in the newly scanned ballots is later than the date/time stamp of the last ballot of the original results, then system 10 will replace the original results with the results of the newly scanned ballots. However, if the date/time stamp of the first ballot in the newly scanned ballots is later than the date/time stamp of the last ballot of the original results, then system 10 will add the results of the newly scanned ballots to the original results. System 10 is also able to determine what cause of action to take if the date/time stamps of the various files are different than in the two scenarios described above. Thus, system 10 eliminates the requirement for an "add to" or "replace" prompt associated with the election results database, and, eliminates the possibility of user error.

While the present invention has been described and illustrated hereinabove with reference to an exemplary embodiment, it should be understood that various modifications could be made to this embodiment without departing from the scope of the invention. In addition, it should be understood that the exemplary embodiment embodies different inventive features, any one of which could be implemented without the others in accordance with the invention. For example, the system of the exemplary embodiment is configurable so as to process both folded and unfolded ballots as desired for a particular election. However, the invention encompasses systems that are only configured to process folded ballots. Also, the system of the exemplary embodiment uses both an adjustable pick-up mechanism (which passes a single folded or unfolded ballot) and a double feed detection system (which detects the passage of more than one folded or unfolded ballot through a detection zone) to ensure that only one folded or unfolded ballot is processed at the same time. Either one of these features could be implemented without the other in accordance with the invention. Therefore, the present invention is not to be limited to the specific configuration of the exemplary embodiment, except insofar as such limitations are included in the following claims.

What is claimed and desired to be secured by Letters Patent is as follows:

1. A system for processing folded and unfolded documents, comprising:

an input hopper configured to receive a stack of documents, wherein said documents comprise either a plurality of folded documents or a plurality of unfolded documents;

an imaging area in which each of said documents is imaged;

a pick-up mechanism configured to transport each of said documents from said input hopper to said imaging area, wherein said pick-up mechanism comprises a first barrier spaced from a second barrier to define a gap through which each of said documents is passed, wherein at least one of said first and second barriers is adjustable between a first position in which said gap is dimensioned to prevent passage of more than one of said folded documents and a second position in which said gap is dimensioned to prevent passage of more than one of said unfolded documents; and a detection system operable to detect the passage of more than one of said documents through a detection zone, wherein said detection system is adjustable to operate in either a first mode for detecting the passage of more than one of said folded documents or a second mode for detecting the passage of more than one of said unfolded documents.

2. The system of claim 1, wherein each of said documents comprises an election ballot.

3. The system of claim 1, wherein said detection zone is positioned within said imaging area.

4. The system of claim 1, wherein said first barrier comprises a document mover configured to pass each of said documents through said gap, and said second barrier comprises a document retarder configured to prevent more than one of said documents from passing through said gap.

5. The system of claim 4, wherein said document mover comprises at least one roller and said document retarder comprises at least one belt, wherein said roller and said belt rotate in a same direction.

6. The system of claim 5, wherein said belt is adjustable between said first and second positions so as to adjust a distance between said belt and said roller.

7. The system of claim 6, wherein said distance between said belt and said roller is greater than a thickness of one of said folded documents and less than a combined thickness of two of said folded documents when said belt is in said first position.

8. The system of claim 6, wherein said distance between said belt and said roller is greater than a thickness of one of said unfolded documents and less than a combined thickness of two of said unfolded documents when said belt is in said second position.

9. The system of claim 1, wherein said detection system comprises a sensor in communication with a processor.

10. The system of claim 9, wherein said sensor comprises an acoustic sensor.

11. The system of claim 9, wherein said sensor comprises a light sensor.

12. The system of claim 9, wherein said sensor comprises first and second reading devices.

13. The system of claim 12, wherein each of said documents has a first document side and a second document side each of which presents an identification mark, and wherein said first reading device is positioned to read said identification mark presented on said first document side and said second reading device is positioned to read said identification mark presented on said second document side.

14. The system of claim 13, wherein each of said first and second reading devices comprises a barcode reader and wherein each of said identification marks comprises a barcode.

15. A system for processing folded documents, comprising:

an input hopper configured to receive a stack of folded documents;

an imaging area in which each of said folded documents is imaged;

a pick-up mechanism configured to transport each of said folded documents from said input hopper to said imaging area, wherein said pick-up mechanism comprises a first barrier spaced from a second barrier to define a gap through which each of said folded documents is passed, wherein said gap is dimensioned to prevent passage of more than one of said folded documents; and a detection system operable to detect the passage of more than one of said folded documents through a detection zone.

16. The system of claim 15, wherein each of said folded documents comprises a folded election ballot.

17. The system of claim 15, wherein said detection zone is positioned within said imaging area.

18. The system of claim 15, wherein said first barrier comprises a document mover configured to pass each of said folded documents through said gap, and said second barrier comprises a document retarder configured to prevent more than one of said folded documents from passing through said gap.

19. The system of claim 18, wherein said document mover comprises at least one roller and said document retarder comprises at least one belt, wherein said roller and said belt rotate in a same direction.

20. The system of claim 19, wherein a distance between said belt and said roller is greater than a thickness of one of said folded documents and less than a combined thickness of two of said folded documents.

21. The system of claim 15, wherein said detection system comprises a sensor in communication with a processor.

22. The system of claim 21, wherein said sensor comprises an acoustic sensor.

23. The system of claim 21, wherein said sensor comprises a light sensor.

24. The system of claim 21, wherein said sensor comprises first and second reading devices.

25. The system of claim 24, wherein each of said folded documents has a first document side and a second document side each of which presents an identification mark, and wherein said first reading device is positioned to read said identification mark presented on said first document side and said second reading device is positioned to read said identification mark presented on said second document side.

26. The system of claim 25, wherein each of said first and second reading devices comprises a barcode reader and wherein each of said identification marks comprises a barcode.

27. A system for processing folded documents, comprising:

an input hopper configured to receive a stack of folded documents;

an imaging area in which each of said folded documents is imaged; and a pick-up mechanism configured to transport each of said folded documents from said input hopper to said imaging area, wherein said pick-up mechanism comprises a first barrier spaced from a second barrier to define a gap through which each of said folded documents is passed, wherein said gap is dimensioned to prevent passage of more than one of said folded documents.

28. The system of claim 27, wherein each of said folded documents comprises a folded election ballot.

29. The system of claim 27, wherein said first barrier comprises a document mover configured to pass each of said folded documents through said gap, and said second barrier comprises a document retarder configured to prevent more than one of said folded documents from passing through said gap.

30. The system of claim 29, wherein said document mover comprises at least one roller and said document retarder comprises at least one belt, wherein said roller and said belt rotate in a same direction.

31. The system of claim 30, wherein a distance between said belt and said roller is greater than a thickness of one of said folded documents and less than a combined thickness of two of said folded documents.

32. A system for processing folded documents, comprising:

an input hopper configured to receive a stack of folded documents, wherein each of said folded documents has a first document side that presents a first identification mark and a second document side that presents a second identification mark;

an imaging area in which each of said folded documents is imaged;

a pick-up mechanism configured to transport each of said folded documents from said input hopper to said imaging area; and a detection system operable to detect the passage of more than one of said folded documents through a detection zone, comprising:

a first reading device positioned to read said first identification mark presented on said first document side as each of said folded documents passes through said detection zone;

a second reading device positioned to read said second identification mark presented on said second document side as each of said folded documents passes through said detection zone; and a processor in communication with each of said first and second reading devices, wherein said processor receives data that provides information on said first and second identification marks read by said first and second reading devices, respectively, and wherein said processor analyzes said data to detect the passage of more than one of said folded documents through said detection zone.

33. The system of claim 32, wherein each of said folded documents comprises a folded election ballot.

34. The system of claim 32, wherein said detection zone is positioned within said imaging area.

35. The system of claim 32, wherein said first and second identification marks are unique for each of said folded documents.

36. The system of claim 35, wherein said processor detects the passage of more than one of said folded documents through said detection zone when said first and second identification marks correspond to different folded documents.

37. The system of claim 32, wherein each of said first and second reading devices comprises a barcode reader and wherein each of said identification marks comprises a barcode.

38. The system of claim 32, wherein said first reading device captures an image of said first identification mark and said wherein said second reading device captures an image of said second identification mark.

39. The system of claim 38, wherein said processor decodes said images of said first and second identification marks.

40. The system of claim 38, wherein each of said folded documents presents one or more selections marked on each of said first and second document sides.

41. The system of claim 40, wherein said first reading device captures an image of said selections marked on said first document side and wherein said second reading device captures an image of said selections marked on said second document side.

42. The system of claim 41, wherein said processor decodes said images of said selections marked on said first and second document sides.

43. The system of claim 32, wherein said pick-up mechanism comprises a first barrier spaced from a second barrier to define a gap through which each of said folded documents is passed, wherein said gap is dimensioned to prevent passage of more than one of said folded documents.

44. The system of claim 43, wherein said first barrier comprises a document mover configured to pass each of said folded documents through said gap, and said second barrier comprises a document retarder configured to prevent more than one of said folded documents from passing through said gap.

45. The system of claim 44, wherein said document mover comprises at least one roller and said document retarder comprises at least one belt, wherein said roller and said belt rotate in a same direction.

46. The system of claim 45, wherein a distance between said belt and said roller is greater than a thickness of one of said folded documents and less than a combined thickness of two of said folded documents.

* * * * *